United States Patent
Norieda et al.

(10) Patent No.: US 12,261,840 B2
(45) Date of Patent: Mar. 25, 2025

(54) AUTHENTICATION TERMINAL, ENTRANCE/EXIT MANAGEMENT SYSTEM, ENTRANCE/EXIT MANAGEMENT METHOD, AND PROGRAM

(71) Applicant: NEC Corporation, Tokyo (JP)

(72) Inventors: Shin Norieda, Tokyo (JP); Kenta Fukuoka, Tokyo (JP); Masashi Yoneda, Tokyo (JP); Shogo Akasaki, Tokyo (JP); Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 17/797,971

(22) PCT Filed: Feb. 28, 2020

(86) PCT No.: PCT/JP2020/008500
§ 371 (c)(1),
(2) Date: Aug. 5, 2022

(87) PCT Pub. No.: WO2021/171607
PCT Pub. Date: Sep. 2, 2021

(65) Prior Publication Data
US 2023/0056993 A1 Feb. 23, 2023

(51) Int. Cl.
*H04L 9/40* (2022.01)
(52) U.S. Cl.
CPC ................ *H04L 63/0861* (2013.01)
(58) Field of Classification Search
CPC .................................................. H04L 63/0861
See application file for complete search history.

(56) References Cited

U.S. PATENT DOCUMENTS

| | | | |
|---|---|---|---|
| 11,532,198 B1* | 12/2022 | Lyle | G06Q 10/109 |
| 2010/0134310 A1* | 6/2010 | Zheng | G07C 9/25 340/5.2 |

(Continued)

FOREIGN PATENT DOCUMENTS

| | | |
|---|---|---|
| JP | 2010-250475 A | 11/2010 |
| JP | 2017-049867 A | 3/2017 |

(Continued)

OTHER PUBLICATIONS

JP Office Action for JP Application No. 2022-503046, mailed on May 30, 2023 with English Translation.

(Continued)

*Primary Examiner* — Viet D Vu

(57) ABSTRACT

Provided is an authentication terminal for appropriately protecting the privacy of a visitor. The authentication terminal is provided with an acquisition unit, an authentication request unit, and an output unit. The acquisition unit acquires the biometric information of a user. The authentication request unit requests an authentication process using the biometric information of the user by a server device and controls the opening/closing of a gate in accordance with the authentication result acquired from the server device. The output unit outputs displayed information based on the authentication result to an aerial display with which it is possible for a person at a prescribed position to visually recognize the displayed information based on the authentication result.

5 Claims, 29 Drawing Sheets

(56) References Cited

U.S. PATENT DOCUMENTS

| | | | |
|---|---|---|---|
| 2013/0227651 A1* | 8/2013 | Schultz | G06F 21/32 |
| | | | 726/4 |
| 2014/0109018 A1* | 4/2014 | Casey | G06F 3/04883 |
| | | | 715/863 |
| 2016/0269399 A1* | 9/2016 | Abreu | H04L 63/0861 |
| 2016/0308859 A1* | 10/2016 | Barry | G07C 9/22 |
| 2018/0060550 A1* | 3/2018 | Li | G06F 3/017 |
| 2020/0026840 A1 | 1/2020 | Pathak et al. | |
| 2020/0201442 A1 | 6/2020 | Chikuri | |
| 2022/0215666 A1* | 7/2022 | Furuhata | G06T 7/70 |

FOREIGN PATENT DOCUMENTS

| | | |
|---|---|---|
| JP | 2019-101566 A | 6/2019 |
| JP | 2020-009109 A | 1/2020 |
| WO | 2015/151251 A1 | 10/2015 |
| WO | 2018/235191 A1 | 12/2018 |

OTHER PUBLICATIONS

International Search Report for PCT Application No. PCT/JP2020/008500, mailed on Jul. 21, 2020.

English translation of Written opinion for PCT Application No. PCT/JP2020/008500, mailed on Jul. 21, 2020.

Assist-Corp, 2020, pp. 1-2, <URL:https://www.assist-corp.tv/vision>.

Asukanet,"ASKA3D", 2022, pp. 1-6, <URL:https://www.asukanet.co.jp/contents/product/aerialimaging.html>.

* cited by examiner

Fig.3

WELCOME, MR./MS. A

IS THERE PERSON YOU DESIRE TO
HAVE MEETING WITH IN FLOOR?

YES     No

Fig.8

SYSTEM USER REGISTRATION

NAME

EMPLOYEE NUMBER

DEPARTMENT TO WHICH PERSON BELONGS

MANAGERIAL POSITION

COMMENTS

REGISTER FACE IMAGE FILE

SELECT FILE

SELECT NEW REGISTRATION OR UPDATE OF REGISTERED CONTENT

NEW REGISTRATION    UPDATE

SEND

Fig.10

USER DATABASE

| USER ID | FEATURE AMOUNT | FACE IMAGE | NAME | EMPLOYEE NUMBER | DEPARTMENT TO WHICH PERSON BELONGS | MANAGERIAL POSITION | ... |
|---|---|---|---|---|---|---|---|
| ID01 | FV1 | F1 | AAA | 12345X1 | X11 | X21 | ... |
| ID02 | FV2 | F2 | BBB | 12345X2 | X12 | X22 | ... |
| ID03 | FV3 | F3 | CCC | 12345X4 | X13 | X23 | ... |
| ... | ... | ... | ... | ... | ... | ... | ... |

Fig.11

ENTERING PERSON MANAGEMENT DATABASE

| USER ID | ENTRANCE DATE AND TIME | POSITION INFORMATION |
|---|---|---|
| ID01 | 2020/1/20 12:01:01 | (X1,Y1) |
| ID02 | 2020/1/20 12:10:13 | (X2,Y2) |
| ID03 | 2020/1/20 12:13:25 | (X3,Y3) |
| ID04 | 2020/1/20 12:30:30 | (X4,Y4) |
| ... | ... | ... |

Fig.12

ENTERING PERSON MANAGEMENT DATABASE

| USER ID | ENTRANCE DATE AND TIME | POSITION INFORMATION | STATE |
|---|---|---|---|
| ID01 | 2020/1/20 12:01:01 | (X1,Y1) | IN MEETING |
| ID02 | 2020/1/20 12:02:13 | (X2,Y2) | IN MEETING |
| ID03 | 2020/1/20 12:13:25 | (X3,Y3) | REGULAR WORK |
| ID04 | 2020/1/20 12:30:30 | (X4,Y4) | REGULAR WORK |
| ... | ... | ... | ... |

Fig.19A

INFORMATION INPUT OF
PERSON TO MEET

INPUT DEPARTMENT TO
WHICH PERSON BELONGS

X11

CONFIRM

Fig.19B

INFORMATION INPUT OF
PERSON TO MEET

INPUT TIME ZONE

11:00~12:00 ▼

CONFIRM

Fig.19C

INFORMATION INPUT OF
PERSON TO MEET

SELECT ONE OF THESE

◉ IN MEETING
○ REGULAR WORK

CONFIRM

Fig.21

CONFERENCE ROOM MANAGEMENT DATABASE

| USER ID | CONFERENCE ROOM | USE TIME |
|---------|-----------------|----------|
| ID01 | CONFERENCE ROOM A | 2020/1/20 10:00 – 11:00 |
| ID02 | CONFERENCE ROOM A | 2020/1/20 10:00 – 11:00 |
| ID03 | CONFERENCE ROOM A | 2020/1/20 10:00 – 11:00 |
| ID04 | CONFERENCE ROOM B | 2020/1/22 13:00 – 15:00 |
| ... | ... | ... |

Fig.23

CONFERENCE DETAILED INFORMATION

CONFERENCE ROOM NUMBER: A

CONFERENCE TIME: 10:00~11:00

PARTICIPANTS:

MR./MS. AAA

MR./MS. BBB

MR./MS. CCC

AUTHENTICATION TERMINAL, ENTRANCE/EXIT MANAGEMENT SYSTEM, ENTRANCE/EXIT MANAGEMENT METHOD, AND PROGRAM

This application is a National Stage Entry of PCT/JP2020/008500 filed on Feb. 28, 2020, the contents of all of which are incorporated herein by reference, in their entirety.

TECHNICAL FIELD

The present invention relates to an authentication terminal, an entrance/exit management system, an entrance/exit management method, and program.

BACKGROUND ART

In recent years, various ways of working have been promoted. For example, a "free address" has been promoted in which work is performed without determining a specific desk and by freely using vacant seats.

For example, PTL 1 describes providing a system capable of confirming the presence status of a user without moving to the seat position. The system disclosed in PTL 1 includes a user terminal and a server. A camera is provided in the user terminal. The user terminal detects the face of a user based on the input image from the camera, determines whether a user is present, and transmits presence information indicating a determination result to the server. The server stores the presence information transmitted from each of user terminals. In a case where there is a request for confirmation of the presence information of a user from the terminal of another user, the server transmits the stored presence information to the terminal of the another user.

CITATION LIST

Patent Literature

[PTL 1] JP 2019-101566 A

SUMMARY OF INVENTION

Technical Problem

In a free address floor, seats to be used on a daily basis may not be fixed, but this does not mean that an unspecified number of users can use the floor. Therefore, entry and exit of users are nevertheless managed as a matter of course on a free address floor. Specifically, an authentication terminal and a gate controlled by the terminal are installed at the entrance of the free address floor. When the authentication of a visitor is successful, the authentication terminal often notifies the user that the authentication is successful while displaying the name and the like of the visitor. However, such a response causes a problem that the name or the like of the visitor becomes known to other visitors. In particular, in recent years, due to an increase in privacy awareness, there is a demand for concealing names and the like even among employees of the same company or the like when the department to which the employees belong is different.

A main object of the present invention is to provide an authentication terminal, an entrance/exit management system, an entrance/exit management method, and a program that contribute to suitably protecting privacy of a visitor.

Solution to Problem

According to a first aspect of the present invention, there is provided an authentication terminal including: an acquisition unit that acquires biometric information of a user; an authentication request unit that requests a server device for an authentication process using the biometric information of the user, and controls opening/closing of a gate in accordance with an authentication result acquired from the server device; and an output unit that outputs displayed information based on the authentication result to an aerial display with which it is possible for a person at a prescribed position to visually recognize the displayed information based on the authentication result.

According to a second aspect of the present invention, there is an entrance/exit management system including: a server device that performs authentication using biometric information; and an authentication terminal, in which the authentication terminal includes an acquisition unit that acquires biometric information of a user, an authentication request unit that requests an authentication process using the biometric information of the user by the server device, and controls opening/closing of a gate in accordance with an authentication result acquired from the server device, and an output unit that outputs displayed information based on the authentication result to an aerial display with which it is possible for a person at a prescribed position to visually recognize the display based on the authentication result.

According to a third aspect of the present invention, there is provided an entrance/exit management method including: in an authentication terminal, acquiring biometric information of a user; requesting a server device for an authentication process using the biometric information of the user, and controlling opening/closing of a gate in accordance with an authentication result acquired from the server device; and outputting displayed information based on the authentication result to an aerial display with which it is possible for a person at a prescribed position to visually recognize the displayed information based on the authentication result.

According to a fourth aspect of the present invention, there is provided a computer-readable storage medium that stores a program for causing a computer mounted on an authentication terminal to execute processing of acquiring biometric information of a user; requesting a server device for an authentication process using the biometric information of the user, and controlling opening/closing of a gate in accordance with an authentication result acquired from the server device; and outputting displayed information based on the authentication result to an aerial display with which it is possible for a person at a prescribed position to visually recognize the displayed information based on the authentication result.

Advantageous Effects of Invention

According to each point of view of the present invention, there are provided an authentication terminal, an entrance/exit management system, an entrance/exit management method, and a program that contribute to suitably protecting privacy of a visitor. The effect of the present invention is not limited to the above. According to the present invention, other effects may be exhibited instead of or in addition to these effects.

BRIEF DESCRIPTION OF DRAWINGS

FIG. 3 is a diagram illustrating an example of display by an authentication terminal according to the first example embodiment.

FIG. 8 is a diagram for describing an operation of a user information acquisition unit according to the first example embodiment.

FIG. 10 is a diagram illustrating an example of a user database according to the first example embodiment.

FIG. 11 is a diagram illustrating an example of an entering person management database according to the first example embodiment.

FIG. 12 is a diagram illustrating an example of the entering person management database according to the first example embodiment.

FIGS. 19A to 19C are diagrams illustrating an example of display by the authentication terminal according to the fourth example embodiment.

FIG. 21 is a diagram illustrating an example of a conference room management database according to the fifth example embodiment.

FIG. 23 is a diagram for describing an operation of a conference information display unit according to the fifth example embodiment.

EXAMPLE EMBODIMENT

Figure 1:
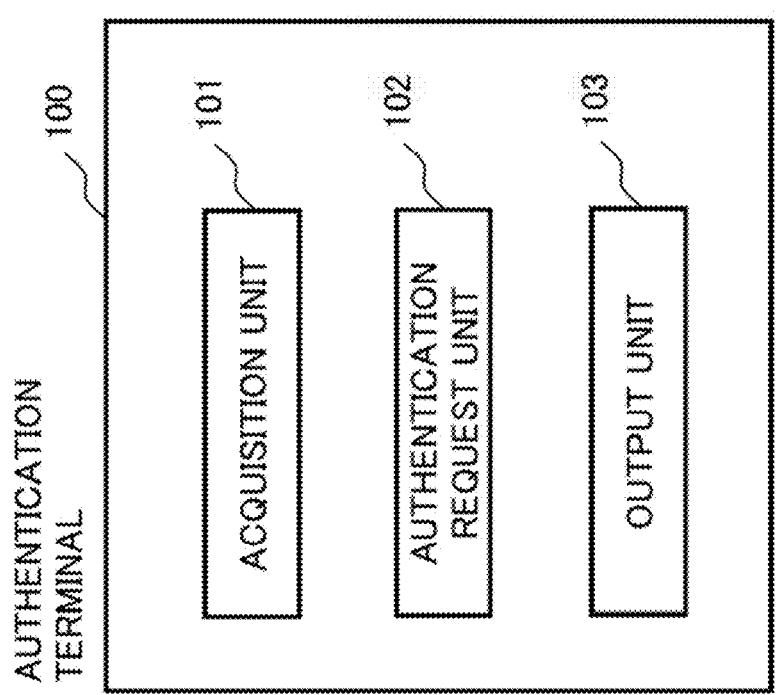
FIG. 1 is a diagram for describing an outline of an example embodiment.

First, an outline of an example embodiment will be described. The reference numerals in the drawings attached to this outline are attached to each element for convenience as an example for assisting understanding, and the description of this outline is not intended to be any limitation. In a case where there is no particular description, the block described in each drawing represents not a configuration of a hardware unit but a configuration of a functional unit. Connection lines between blocks in each drawing include both bidirectional and unidirectional lines. The unidirectional arrow schematically indicates a main flow of a signal (data) and does not exclude bidirectionality. In the present specification and the drawings, elements that can be similarly described are denoted by the same reference numerals, and redundant description can be omitted.

An authentication terminal 100 according to the example embodiment includes an acquisition unit 101, an authentication request unit 102, and an output unit 103 (refer to FIG. 1). The acquisition unit 101 acquires the biometric information of a user. The authentication request unit 102 requests a server device for an authentication process using the biometric information of the user and controls the opening/closing of a gate in accordance with the authentication result acquired from the server device. The output unit 103 outputs displayed information based on the authentication result to an aerial display with which it is possible for a person at a prescribed position to visually recognize the displayed information based on the authentication result.

The authentication terminal 100 requests a server device for an authentication process using the biometric information of the user and controls the opening/closing of a gate in accordance with the authentication result acquired from the server device. The authentication terminal 100 outputs displayed information based on the authentication result to an aerial display. Since the authentication terminal 100 outputs the displayed information based on the authentication result to the aerial display, a third party other than the visitor cannot recognize the display. This is because the person who can visually recognize the displayed information by the aerial display is limited to a person at a prescribed position based on the display. As a result, the privacy of the visitor is suitably protected.

Hereinafter, specific example embodiments will be described in more detail with reference to the drawings.

First Example Embodiment

A first example embodiment will be described in more detail with reference to the drawings.

Figure 2:
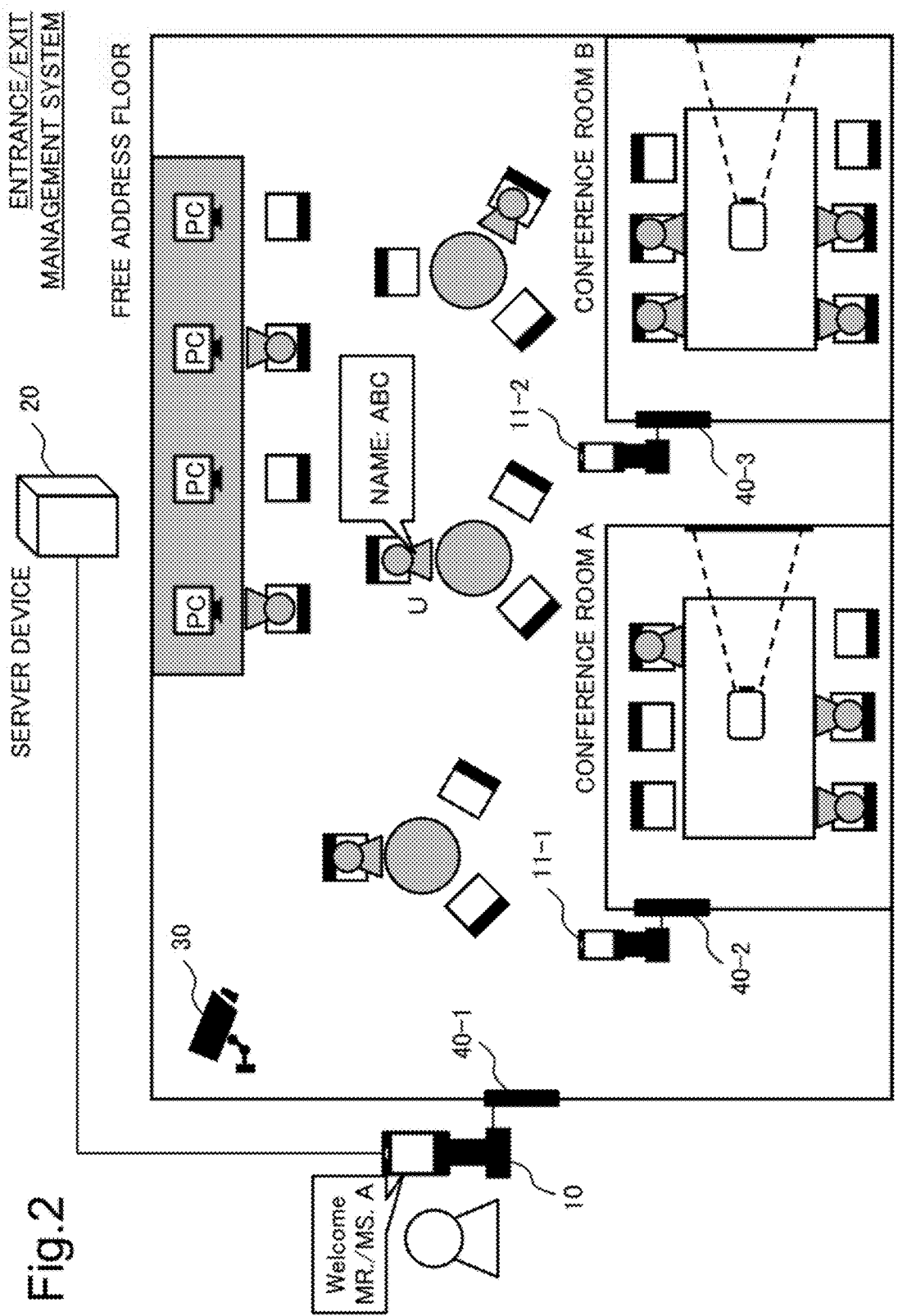
FIG. 2 is a diagram illustrating an example of a schematic configuration of an entrance/exit management system according to a first example embodiment.

FIG. 2 is a diagram illustrating an example of a schematic configuration of an entrance/exit management system according to a first example embodiment. Referring to FIG. 2, the entrance/exit management system includes an authentication terminal 10, conference room terminals 11-1 and 11-2, and a server device 20. An entrance/exit management system according to the first example embodiment manages entrance and exit related to a user of a free address floor (hereinafter, simply referred to as a floor).

At least one or more camera devices 30 are installed on the floor illustrated in FIG. 2. The camera device 30 is installed in such a way as to overlook the entire floor Although FIG. 2 illustrates one camera device 30, in a case where a plurality of camera devices 30 is required to obtain an image of the entire floor in a bird's eye view, the number of camera devices 30 to achieve this object is installed.

In the following description, when there is no particular reason to distinguish the conference room terminals 11-1 and 11-2, the conference room terminals 11-1 and 11-2 are simply referred to as "conference room terminals 11". Similarly, for other components, reference numerals on the left side separated by hyphens are used to represent the components.

The devices illustrated in FIG. 2 are connected to each other. For example, the authentication terminal 10 and the server device 20 are connected by wired or wireless communication means and are configured to be able to communicate with each other. Although FIG. 2 illustrates a connection line between the authentication terminal 10 and the server device 20, other components (conference room terminal 11, camera device 30) are also connected to the server device 20. Furthermore, a stationary personal computer (PC) installed in the floor is also connected to the server device 20.

The server device 20 may be installed in the same building as the free address floor or may be installed on a network (on a cloud).

The authentication terminal 10 is a terminal installed at the entrance of the free address floor. The authentication terminal 10 is connected to a gate 40-1. When the authentication of the visitor is successful, the authentication terminal 10 opens the gate 40-1 and permits the visitor to use the free address floor.

The conference room terminal 11 is a terminal installed at an entrance of a conference room in a floor. When the authentication of the user (the person entering the floor) who has reserved the conference room is successful, the conference room terminal 11 opens the relevant gate 40 such that the user can use the conference room. The conference room terminal 11 can display information on a conference being held in addition to the authentication function (opening/closing control of the gate 40). For example, the conference room terminal 11 displays names of participants of the conference, and displays purposes, agenda, and the like of the conference.

The server device 20 is a device that manages users in the floor. The server device 20 executes authentication processing using the biometric information (for example, biometric information on the face) of the visitor acquired via the authentication terminal 10. The server device 20 notifies the authentication terminal 10 of the result of the authentication process.

The server device 20 manages the position of the user (the person entering the floor and the person staying in the floor) in the floor. The server device 20 grasps the position of each user by any means in real time.

For example, the server device 20 may acquire position information from a terminal (terminal such as a smartphone) possessed by the user to grasp the position of the user. In this case, the terminal carried by the user may receive a global positioning system (GPS) signal from GPS satellites, execute positioning, and generate position information including the latitude, longitude, and altitude of the own device.

The server device 20 may detect the position of the user by analyzing the image obtained from the camera device 30. In the first example embodiment, a case where the server device 20 grasps the position of the user by analyzing the image obtained from the camera device 30 will be described.

A visitor (a user who intends to enter the free address floor) may wish to meet (conference, meeting) with a user in the floor. In this case, after the authentication by the authentication terminal 10 succeeds, the visitor inputs information related to a person (hereinafter, it is described as a person to meet) the visitor desires to have a meeting with.

For example, the authentication terminal 10 uses a graphical user interface (GUI) as illustrated in FIG. 3 to confirm whether the visitor has an intention (an intention that the visitor desires to have a meeting with another user). When it is found that the visitor has an intention to have a meeting with another user, the authentication terminal 10 receives the operation of the visitor using a GUI as illustrated in FIG. 4.

Figure 4:
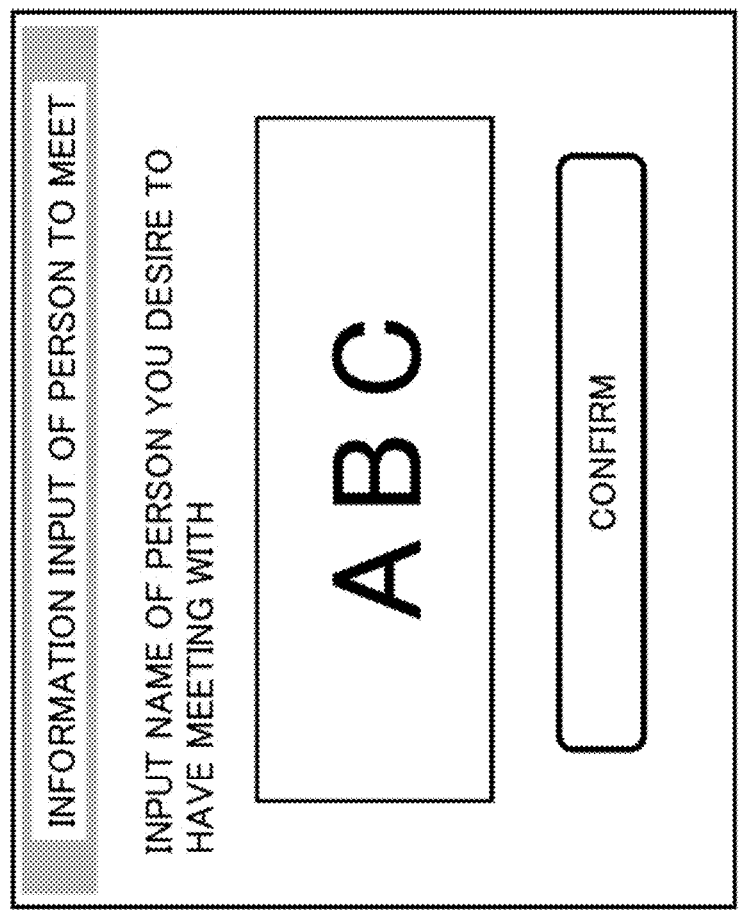
FIG. 4 is a diagram illustrating an example of display by the authentication terminal according to the first example embodiment.

For example, the visitor who is in contact with the screen as illustrated in FIG. 4 inputs the name of a person the visitor desires to have a meeting within the character input field. The visitor presses the confirm button after inputting the name of the person to meet. The authentication terminal 10 transmits the name of the person to meet acquired by the GUI as illustrated in FIG. 4 to the server device 20.

The authentication terminal 10 and the conference room terminal 11 include an input/output device in which a liquid crystal panel and a touch panel are integrated, and display related to a GUI is performed using the input/output device to receive an operation of the user.

The server device 20 specifies the position of the person to meet based on the information (name of the person to meet) acquired from the authentication terminal 10 and notifies the authentication terminal 10 of the specified position.

Figure 5:
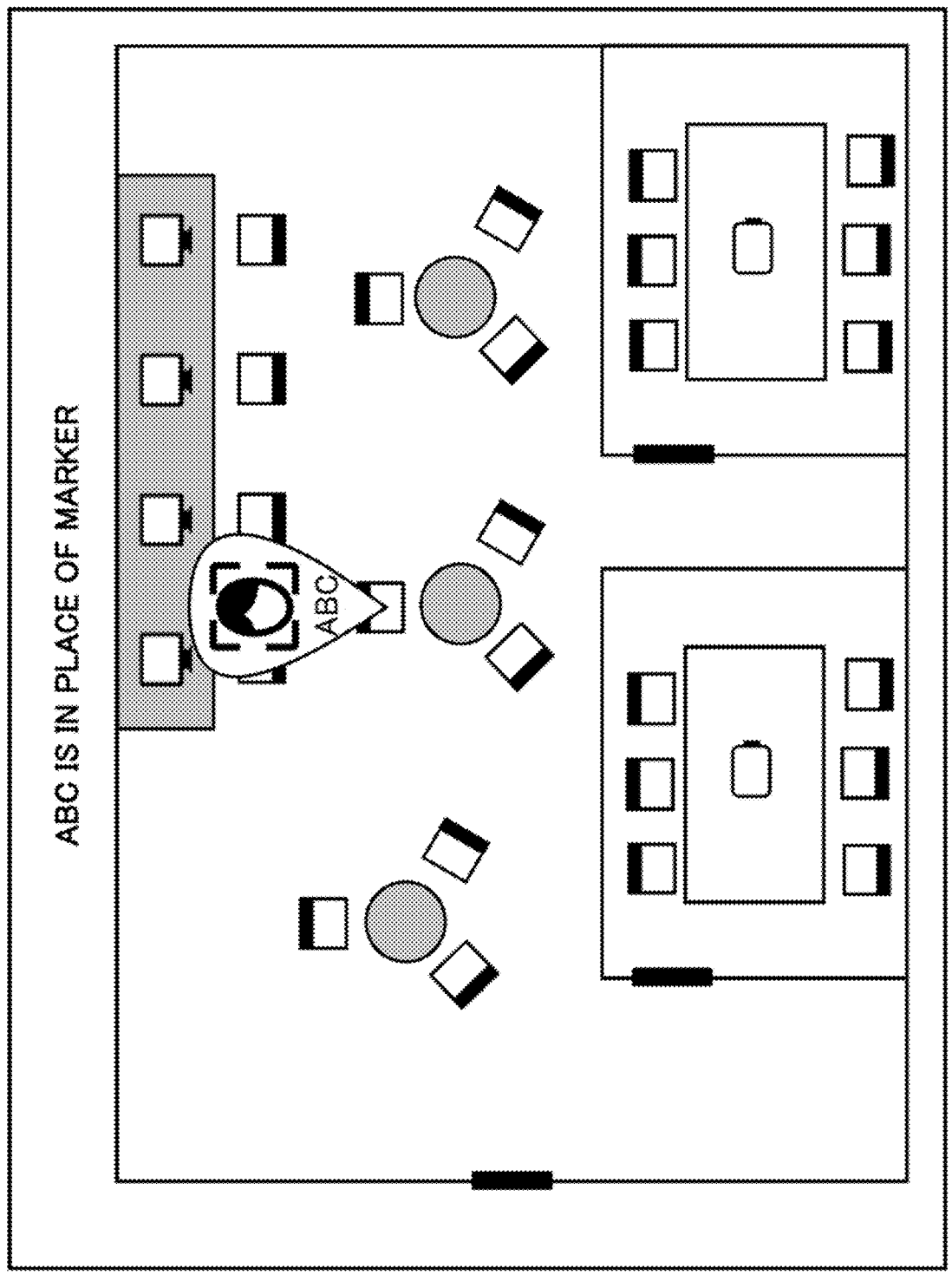
FIG. 5 is a diagram illustrating an example of display by the authentication terminal according to the first example embodiment.

The authentication terminal 10 displays the position of the person to meet (the position of the person to meet in the free address floor) using the acquired information. For example, the authentication terminal 10 displays a screen as illustrated in FIG. 5. For example, as illustrated in FIG. 5, the authentication terminal 10 displays map information imitating a free address floor. Then, the authentication terminal 10 specifies the position of the person to meet by a tear-shaped marker (marker in which the upper and lower sides of the teardrop shape are inverted), and displays the face image, the name, and the like of the person to meet in the marker.

The visitor in contact with the screen as illustrated in FIG. 5 can recognize that the person to meet is seated on the round table in the center of the floor. The visitor can easily grasp the location of the target person and does not need to retrieve a person to meet.

As described above, when the visitor desires to have a meeting with a person in the floor, the authentication terminal 10 requests the server device 20 to retrieve the position of the person. In the following description, a request transmitted from the authentication terminal 10 to the server device 20 is referred to as a "retrieval request". Information specifying the person to meet such as the name of the person to meet is described as "person to meet information". The position information of the person to meet included in the response (response to the retrieval request) transmitted from the server device 20 to the authentication terminal 10 is described as "interview requester position information".

<Advance Preparation>

Here, in order to enable the entrance/exit management of the user by the server device 20, the system user (user of the free address floor) needs to make an advance preparation. The advance preparation will be described below.

The user registers attribute values such as his or her biometric information and profile in the system. Specifically, the user inputs the face image to the server device 20. The user inputs his or her profile (for example, attribute information such as a name, an employee number, a place of employment, a department to which the employee belongs, a managerial position, and a contact information) to the server device 20.

Any method can be used to input information such as the biometric information and the profile. For example, the user may capture his or her face image using a terminal such as a smartphone. Furthermore, the user generates a text file or the like in which the profile is described using the terminal. The user operates the terminal to transmit the information (face image, profile) to the server device 20. Alternatively, the user may input necessary information to the server device 20 using an external storage device such as a universal serial bus (USB) in which the information is stored.

Alternatively, the server device 20 may have a function as a WEB server, and the user may input necessary information by a form provided by the server. Alternatively, a terminal for inputting the information may be installed outside the floor, and the user may input necessary information from the terminal to the server device 20. Alternatively, the user may input necessary information from the authentication terminal 10 to the server device 20.

The server device 20 updates the database that manages the system user using the acquired user information (biometric information, profiles, and the like). Details regarding the update of the database will be described later, but the server device 20 roughly updates the database by the following operation. In the following description, a database for managing users using the system of the present disclosure will be referred to as a "user database".

When the person relevant to the acquired user information is a new user not registered in the user database, the server device 20 assigns an identifier (ID) to the user. The server device 20 generates a feature amount that characterizes the acquired face image.

The server device 20 adds an entry including the ID assigned to the new user, the feature amount generated from the face image, the face image of the user, the profile, and the like to the user database. When the server device 20 registers the user information, the user can enter the free address floor.

Next, details of each device included in the entrance/exit management system according to the first example embodiment will be described.

[Server Device]

Figure 6:
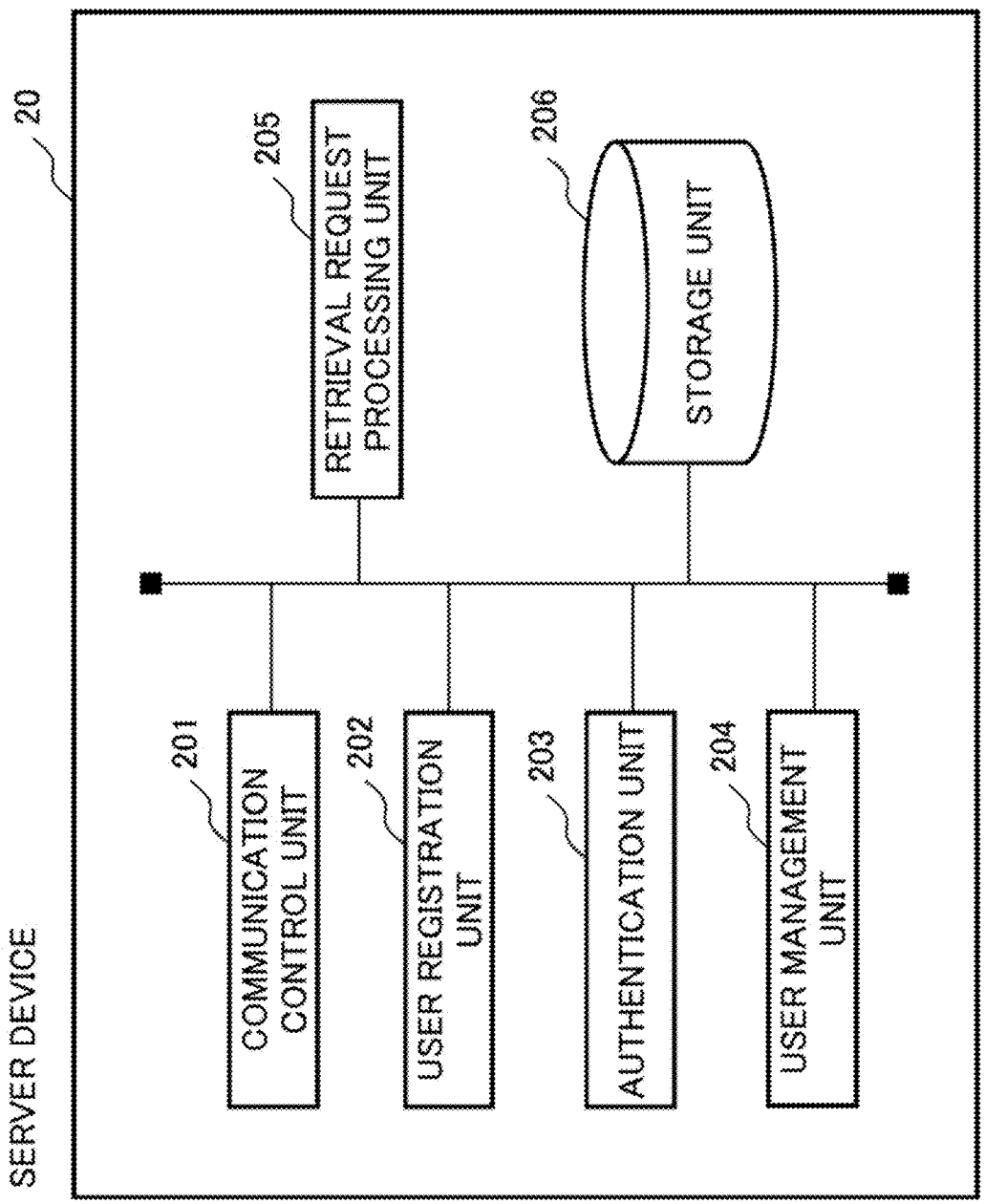
FIG. 6 is a diagram illustrating an example of a processing configuration of a server device according to the first example embodiment.

FIG. 6 is a diagram illustrating an example of a processing configuration (processing module) of the server device 20 according to the first example embodiment. Referring to FIG. 6, the server device 20 includes a communication control unit 201, a user registration unit 202, an authentication unit 203, a user management unit 204, a retrieval request processing unit 205, and a storage unit 206.

The communication control unit 201 is means configured to control communication with other devices. Specifically, the communication control unit 201 receives data (packet) from the authentication terminal 10. The communication control unit 201 transmits data to the authentication terminal 10. The communication control unit 201 delivers data received from another device to another processing module. The communication control unit 201 transmits data acquired from another processing module to another device. In this manner, the another processing modules transmit and receive data to and from other devices via the communication control unit 201.

Figure 7:
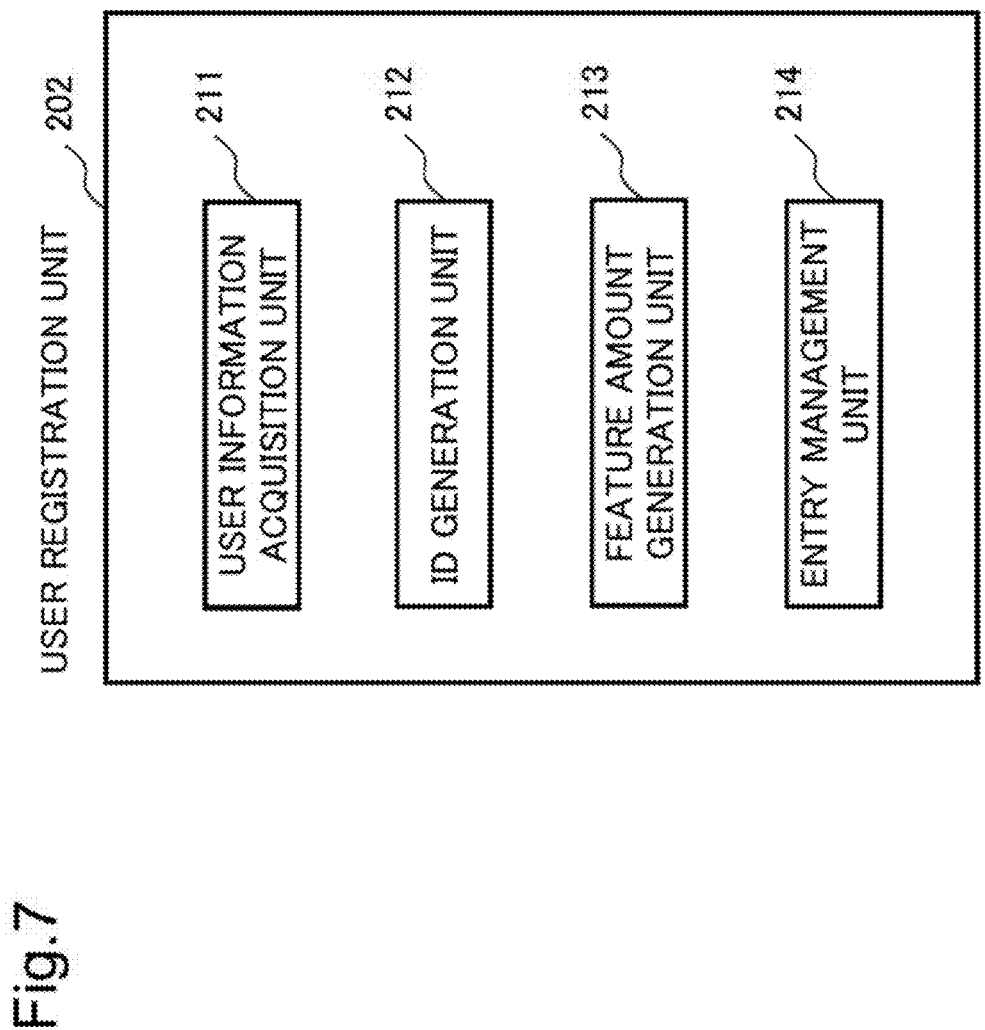
FIG. 7 is a diagram illustrating an example of a processing configuration of a user registration unit according to the first example embodiment.

The user registration unit 202 is means configured to enable the system user registration described above. The user registration unit 202 includes a plurality of submodules. FIG. 7 is a diagram illustrating an example of the processing configuration of the user registration unit 202. Referring to FIG. 7, the user registration unit 202 includes a user information acquisition unit 211, an ID generation unit 212, a feature amount generation unit 213, and an entry management unit 214.

The user information acquisition unit 211 is means configured to acquire the user information described above. The user information acquisition unit 211 acquires biometric information and profiles of a plurality of users who use the entrance/exit management system. More specifically, the user information acquisition unit 211 acquires biometric information (for example, a face image) and a profile (for example, name, affiliation, and the like) of the system user. The system user may input the information from his or her terminal to the server device 20 or may operate the authentication terminal 10 to input the information.

The user information acquisition unit 211 may provide a GUI or a form for inputting the information. For example, the user information acquisition unit 211 displays an information input form as illustrated in FIG. 8 on the terminal operated by the user.

The system user inputs the information illustrated in FIG. 8. The system user selects whether to newly register the user in the system or to update the already registered information. After inputting all the information, the system user presses the "transmit" button, and inputs the biometric information and the profile to the server device 20.

Figure 9:
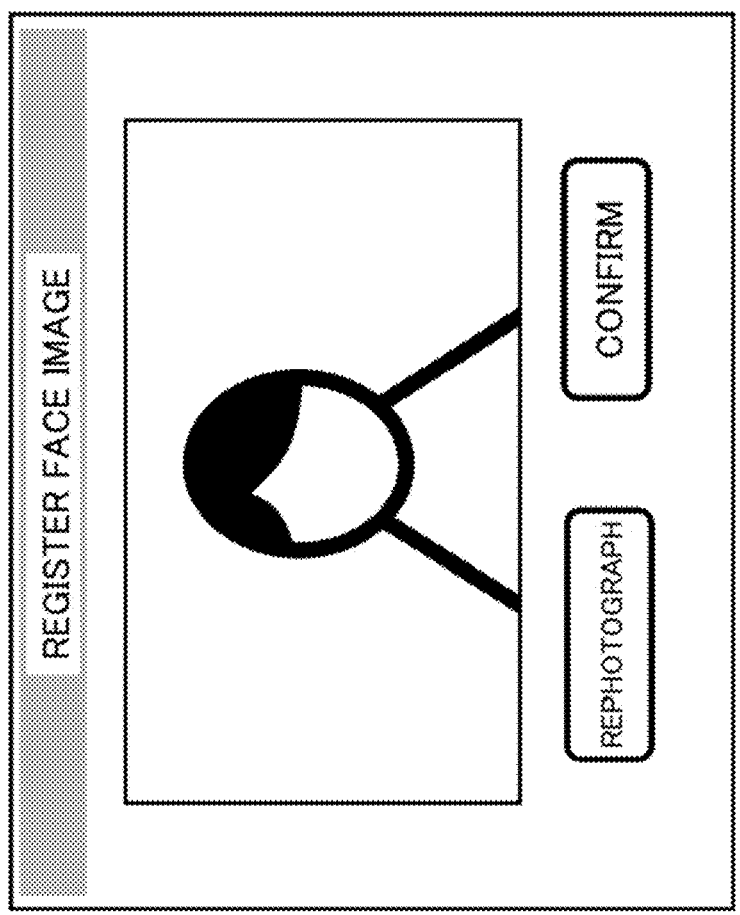
FIG. 9 is a diagram illustrating an example of display by the authentication terminal according to the first example embodiment.

When the user inputs the user information using the authentication terminal 10, the authentication terminal 10 acquires the face image of the user using the interface as illustrated in FIG. 9. When the face image is successfully acquired, the authentication terminal 10 provides the user with an interface for inputting the profile.

The user information acquisition unit 211 stores the acquired user information in the storage unit 206.

The ID generation unit 212 is means configured to generate an ID to be assigned to the system user. When the user information input by the system user is information related to new registration, the ID generation unit 212 generates an ID for identifying the new user. For example, the ID generation unit 212 may calculate a hash value of the acquired user information (face image, profile) and use the hash value as an ID to be assigned to the user. Alternatively, the ID generation unit 212 may assign a unique value each time user registration is performed and use the assigned value as the ID. In the following description, an ID (an ID for identifying a system user) generated by the ID generation unit 212 is referred to as a "user ID".

The feature amount generation unit 213 is means configured to generate a feature amount (a feature vector including a plurality of feature amounts) characterizing the face image from the face image included in the user information. Specifically, the feature amount generation unit 213 extracts feature points from the acquired face image. An existing technology can be used for the feature point extraction processing, and thus a detailed description thereof will be omitted. For example, the feature amount generation unit 213 extracts eyes, a nose, a mouth, and the like as feature points from the face image. Thereafter, the feature amount generation unit 213 calculates the position of each feature point and the distance between the feature points as a feature amount and generates a feature vector (vector information characterizing the face image) including a plurality of feature amounts.

The entry management unit 214 is means configured to manage an entry of the user database. When registering a new user in the database, the entry management unit 214 adds an entry including the user ID generated by the ID generation unit 212, the feature amount generated by the feature amount generation unit 213, the face image, and the profile acquired from the user, to the user database.

When updating the information of the user already registered in the user database, the entry management unit 214 specifies an entry to be subjected to the information update based on the employee number or the like and updates the user database using the acquired user information. At this time, the entry management unit 214 may update a difference between the acquired user information and the information registered in the database or may overwrite each item of the database with the acquired user information. Similarly, regarding the feature amount, the entry management unit 214 may update the database when there is a difference in the generated feature amount or may overwrite the existing feature amount with the newly generated feature amount.

The user registration unit 202 operates to construct a user database (database in which user ID for identifying a system user, biometric information, and profile are stored in association with each other) as illustrated in FIG. 10. It is needless to say that the content registered in the user database illustrated in FIG. 10 is an example and is not intended to limit the information registered in the user database.

The description returns to FIG. 6. The authentication unit 203 is means configured to perform authentication processing of a visitor who has visited the free address floor. The authentication unit 203 acquires an authentication request from the authentication terminal 10. Since the authentication request includes the face image of the visitor (person to be authenticated), the authentication unit 203 extracts the face image from the authentication request. The authentication unit 203 computes a feature amount from the acquired face image.

The authentication unit 203 sets the feature amount computed based on the face image acquired from the authentication terminal 10 as the collation target and performs the collation processing with the feature amount registered in the user database. More specifically, the authentication unit 203 sets the computed feature amount (feature vector) as a collation target and executes one-to-N(N is a positive integer, and the same applies hereinafter) collation with a plurality of feature vectors registered in the user database.

The authentication unit 203 calculates a similarity between the feature amount of the collation target and each of the plurality of feature amounts on the registration side. A chi-square distance, a Euclidean distance, or the like can be used as the similarity. The similarity is lower when the distance is longer, and the similarity is higher when the distance is shorter.

The authentication unit 203 determines that the authentication of the collation target is successful when there is a feature amount having the highest similarity and the similarity with the feature amount of the collation target is equal to or greater than a predetermined value among the plurality of feature amounts registered in the user database. The authentication unit 203 transmits the authentication result (authentication succeeded, authentication failed) to the authentication terminal 10 as a response to the collation request.

The authentication unit 203 reads the user ID relevant to the person who has been successfully authenticated from the user database. The authentication unit 203 delivers the read user ID to the user management unit 204.

The user management unit 204 is means configured to manage users (the person entering the floor and the person staying in the floor) in the free address floor. The user management unit 204 manages the entering person using the user ID acquired from the authentication unit 203. Specifically, the user management unit 204 manages the user ID and the position information of the person relevant to the user ID in association with each other.

The user management unit 204 computes the position of the entering person in real time. As described above, the user management unit 204 computes the position of the entrance by any means. In the first example embodiment, the user management unit 204 analyzes images obtained from the camera devices 30 arranged at various places on the free address floor to compute the position of the entering person.

For example, the user management unit 204 extracts a face area (face image) from the image data acquired from the camera device 30. The user management unit 204 computes a feature amount from the extracted face image and specifies the user ID of the person appearing in the image data by collation processing using the user database. Furthermore, the user management unit 204 converts the coordinates (for example, coordinates of a coordinate system with the lower left of the image data as an origin) of the face image in the image data into coordinates on the floor (coordinates in a coordinate system with an origin such as an entrance door). For example, the user management unit 204 computes the position information of the user by performing the conversion using a conversion table prepared in advance. The user management unit 204 updates the position information of the specified user ID with the position information computed using the image data. Since the size of the face of the person can be regarded as the same to some extent, the distance between the user and the camera device 30 can be estimated from the size of the face. Therefore, the user management unit 204 can estimate the position of the user by preparing the conversion table for each size of the extracted face area.

Alternatively, the free address floor may be divided into squares, and the camera device 30 may be assigned to each of the divided small areas. In this case, the user management unit 204 may estimate the position of the user by referring to information (for example, table information) in which the imaging range and the position of each camera device 30 are associated with each other and analyzing the image data obtained from each camera device 30. In other words, the user management unit 204 may estimate the position of the person relevant to the face image from the position of the camera device 20 that has captured the image including the face image. In other words, when a person appears in the image data obtained from the camera device 30, the user management unit 204 determines that the person exists in the imaging range of the camera device 30 and estimates the position.

Alternatively, the user management unit 204 may compute the position information of the entering person using a stereo camera or the like capable of computing the depth direction as the camera device 30. In this case, the user management unit 204 analyzes the two pieces of image data and calculates the position (coordinates) and the direction of the user based on the position of the camera device 30. Thereafter, the position information of the user may be computed by combining the position of the user management unit 204 or the camera device 30 with the position of the user (adding the relative position of the user to the absolute position of the camera device 30).

Alternatively, as described above, the user management unit 204 may acquire the position information from the terminal possessed by the user. The terminal of the user may generate the position information using the GPS or may generate the position information based on the strength of the radio wave received from the wireless access point such as wireless fidelity (WiFi).

In a case where there is a blind spot or the like of the camera device 30, the user management unit 204 may compute the position of the user from address information or the like of a personal computer (PC) used by the user. For example, address information of a PC and position information where the PC is installed may be stored in association with each other, an entering person may be specified from login information (information for specifying a user who uses the PC) obtained from the PC, and the position information may be computed.

The user management unit 204 manages the user ID, the date and time when the user enters the floor, and the position information of the user in association with each other. Specifically, the user management unit 204 manages the entering person using an entering person management database having a field for storing at least the above three pieces of information. For example, the user management unit 204 manages the entering person using an entering person management database as illustrated in FIG. 11. As illustrated in FIG. 11, the entering person management database is a database that stores at least a user ID relevant to an entering person of a restricted area (free address floor) where entrance and exit is restricted and position information of the entering person in association with each other.

The entering person management database illustrated in FIG. 11 is an example, and the state (work state) of the entering person may be managed in addition to the entrance date and time and the position information. For example, when an entering person is in a meeting, the state of the entering person may be set to "in a meeting", and when the entering person executes business on a round table or the like, the state of the entering person may be set to "regular work" (refer to FIG. 12). Whether the entering person is "in a meeting" may be determined according to the operation of the conference room terminal 11 (whether the conference room terminal 11 permits the entering into the conference room). Alternatively, whether the user is in a meeting may be determined according to the position of the visitor.

The user management unit 204 adds a new entry to the entering person management database immediately after the user enters the free address floor. When the entering person exits from the floor, the user management unit 204 deletes the relevant entry from the entering person management database. The user management unit 204 detects entrance and exit of the user using an image obtained from the camera device 30.

The description returns to FIG. 6. The retrieval request processing unit 205 is means configured to process the "retrieval request" received from the authentication terminal 10. The retrieval request processing unit 205 transmits the position information of the person to meet the visitor desires to having a meeting with to the authentication terminal 10. In response to receiving the retrieval request related to the position of the person to meet from the authentication terminal 10, the retrieval request processing unit 205 transmits "person to meet position information" to the authentication terminal 10.

The retrieval request processing unit 205 extracts information (person to meet information; for example, the name) specifying the person to meet from the retrieval request. The retrieval request processing unit 205 retrieves the user database using the extracted information as a search key, and specifies the relevant user ID.

The retrieval request processing unit 205 refers to the entering person management database and acquires position information (coordinate information in the floor) relevant to the specified user ID.

The retrieval request processing unit 205 transmits a retrieval result including the acquired position information, the name of the person to meet as the retrieval target, the face image, and the like to the authentication terminal 10.

For example, in the example of FIG. 2, when a visitor desires to know the position of an entering person U, a retrieval request including the name (ABC) of the entering person U is transmitted to the server device 20. The retrieval request processing unit 205 acquires the relevant user ID from the user database based on the name (ABC) included in the retrieval request. The retrieval request processing unit 205 refers to the entering person management database and acquires the position information of the person relevant to the user ID read from the user database. The retrieval request processing unit 205 transmits the acquired position information, the name (ABC) of the retrieval target person, and the face image to the authentication terminal 10. The authentication terminal 10 displays a screen indicating the position of the person to meet using the acquired retrieval result (name, face image, and position information). For example, the authentication terminal 10 displays a screen as illustrated in FIG. 5.

There may be a case where users having the same family name and the same given name are registered in the user database. In this case, since the retrieval request processing unit 205 cannot determine which person among the plurality of persons having the same family name and the same given name is the person to meet, the retrieval request processing unit 205 transmits retrieval results (name, face image, and position information) of the plurality of persons to the authentication terminal 10. The authentication terminal 10 may display the retrieval result of each of the plurality of persons. In this case, the visitor may specify the person to meet based on the displayed face image. Alternatively, the retrieval request processing unit 205 may transmit the name and the position information to the authentication terminal 10 when there is one person relevant to the acquired name (person registered in the database) and may transmit the face image in addition to the name and the position information to the authentication terminal 10 when there is a plurality of persons relevant thereto. In other words, the retrieval request processing unit 205 may change the content to be transmitted to the authentication terminal 10 according to the acquired information on the person to meet and the result obtained from the user database.

The storage unit 206 is means configured to store information necessary for the operation of the server device 20.

[Authentication Terminal]

The authentication terminal 10 is a terminal that manages entrance to a restricted area (free address floor). When the authentication using the biometric information registered in the user database was successful, the authentication terminal 10 permits the user who was successful in the authentication to enter the restricted area.

Figure 13:
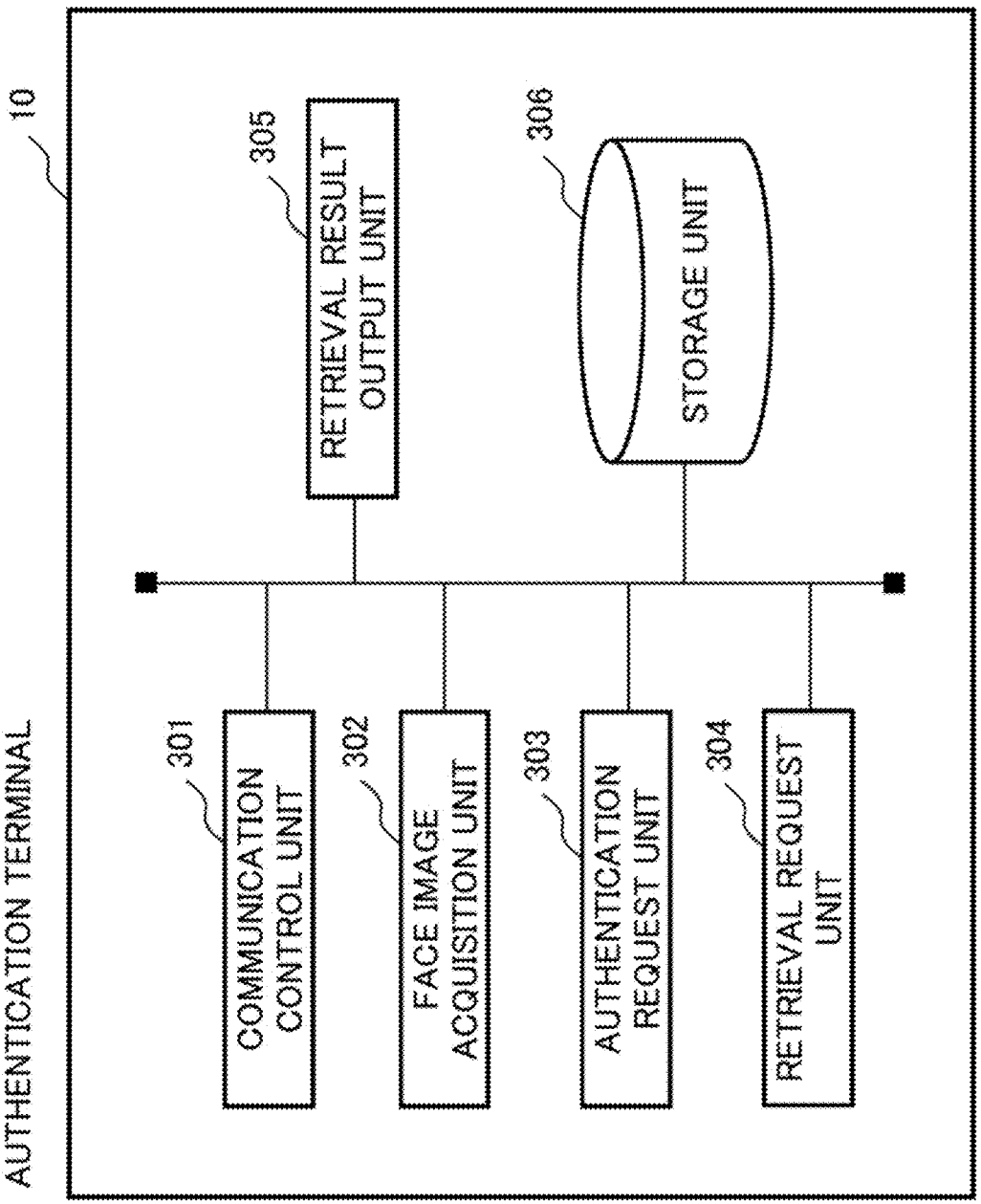
FIG. 13 is a diagram illustrating an example of a processing configuration of the authentication terminal according to the first example embodiment.

FIG. 13 is a diagram illustrating an example of the processing configuration (processing module) of the authentication terminal 10. Referring to FIG. 13, the authentication terminal 10 includes a communication control unit 301, a face image acquisition unit 302, an authentication request unit 303, a retrieval request unit 304, a retrieval result output unit 305, and a storage unit 306.

The communication control unit 301 is means configured to control communication with other devices. Specifically, the communication control unit 301 receives data (packet) from the server device 20. The communication control unit 301 transmits data to the server device 20. The communication control unit 301 delivers data received from another device to another processing module. The communication control unit 301 transmits data acquired from another processing module to another device. In this manner, the another processing modules transmit and receive data to and from other devices via the communication control unit 301.

The face image acquisition unit 302 is means configured to control a camera device (a camera device included in the authentication terminal 10) and acquiring a face image (biometric information) of a visitor in front of the terminal. The face image acquisition unit 302 images the front of the host device periodically or at a predetermined timing. The face image acquisition unit 302 determines whether a face image of a person is included in the acquired image and extracts the face image from the acquired image data when the face image is included.

Since an existing technology can be used for the face image detection processing and the face image extraction processing by the face image acquisition unit 302, detailed description thereof will be omitted. For example, the face image acquisition unit 302 may extract a face image (face area) from image data by using a learning model learned by a convolutional neural network (CNN). Alternatively, the face image acquisition unit 302 may extract the face image using a method such as template matching.

The face image acquisition unit 302 delivers the extracted face image to the authentication request unit 303.

The authentication request unit 303 is means configured to request the server device 20 to authenticate a visitor in front of the terminal. The authentication request unit 303 generates an authentication request including the acquired face image and transmits the authentication request to the server device 20.

The authentication request unit 303 receives a response (authentication succeeded, authentication failed) to the authentication request from the server device 20.

When the authentication result is "authentication failed", the authentication request unit 303 notifies the visitor of this fact. At this time, it is preferable that the authentication request unit 303 also notify the contact information and the like at the time of authentication failure and the like. For example, the authentication request unit 303 displays the fact that the authentication has failed, and the telephone number or the like of the contact information, on a liquid crystal panel or the like.

When the authentication result is "authentication succeeded", the authentication request unit 303 notifies the retrieval request unit 304 of this fact.

The retrieval request unit 304 is means configured to request the server device 20 to retrieve the person to meet. The retrieval request unit 304 performs display for inputting an intention of the visitor as to whether to retrieve the person to meet. For example, the retrieval request unit 304 performs display as illustrated in FIG. 3.

The retrieval request unit 304 opens the gate 40-1 when the visitor does not desire to retrieve the person to meet (in a case where No is selected in FIG. 3). The retrieval request unit 304 closes the gate 40-1 after the visitor enters the floor. Whether a visitor has entered the floor (whether the visitor has passed through the gate 40-1) is detected by a sensor (a sensor using infrared rays or the like) installed in the gate 40-1, and the authentication terminal 10 is notified of the detection result.

When the visitor desires to retrieve the person to meet (in a case where Yes is selected in FIG. 3), the retrieval request unit 304 performs display for inputting information related to the person to meet. For example, the retrieval request unit 304 performs display as illustrated in FIG. 4 (provides GUI).

The retrieval request unit 304 generates a "retrieval request" including the information (person to meet information; for example, the name or the like of the person to meet) acquired via the GUI. The retrieval request unit 304 transmits the generated retrieval request to the server device 20.

The retrieval request unit 304 acquires a response to the request from the server device 20. The retrieval request unit 304 delivers the acquired response to the retrieval result output unit 305.

The retrieval result output unit 305 is means configured to output information related to the retrieval result acquired from the server device 20. Specifically, the retrieval result output unit 305 outputs information related to the position of the person to meet. The retrieval result output unit 305 displays, for example, a screen as illustrated in FIG. 5 on the display by using the response (name, face image, and position information of the person to meet) acquired from the server device 20.

The administrator or the like inputs information necessary for performing the display illustrated in FIG. 5 to the authentication terminal 10 in advance. Specifically, the administrator or the like inputs information related to the layout or the like and information related to the coordinate system to the authentication terminal 10 in advance on the free address floor. For example, the administrator or the like stores a conversion formula or the like for converting the position information (coordinate information) acquired from the server device 20 into coordinates on the map in the authentication terminal 10.

The display illustrated in FIG. 5 is an example and is not intended to limit the output format, the output form, and the like of the retrieval result output unit 305. For example, the retrieval result output unit 305 may transmit the retrieval result to a mail address or the like of the visitor. Alternatively, the retrieval result output unit 305 may notify the visitor by replacing the position information of the person to meet with a brief expression indicating the position information. For example, in the example of FIG. 5, a display or a voice such as "ABC is seated on the center round table" may be output.

The storage unit 306 is means configured to store information necessary for the operation of the authentication terminal 10.

[Operation of Entrance/Exit Management System]

Next, an operation of the entrance/exit management system according to the first example embodiment will be described.

Figure 14:
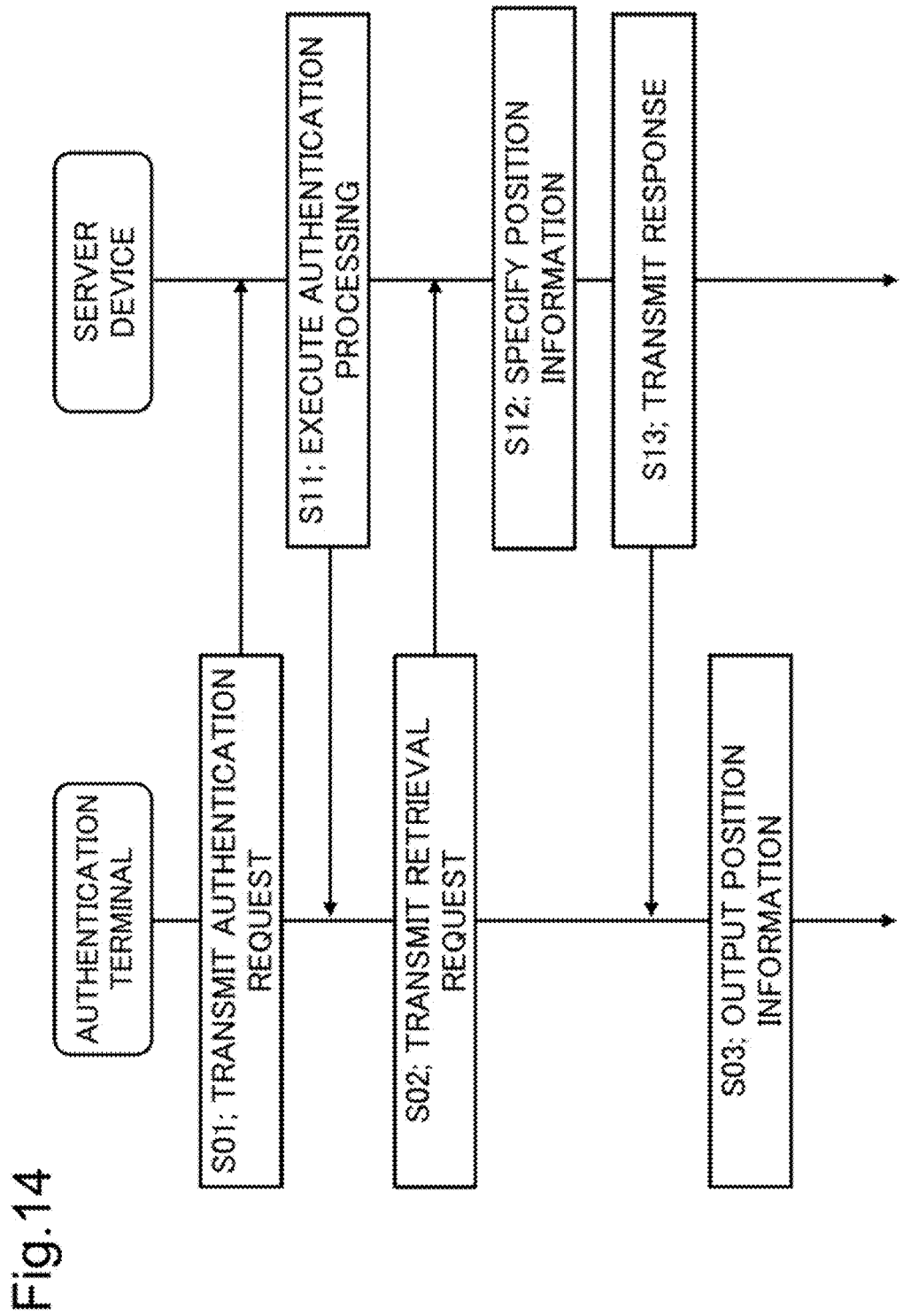
FIG. 14 is a sequence diagram illustrating an example of an operation of the entrance/exit management system according to the first example embodiment.

FIG. 14 is a sequence diagram illustrating an example of an operation of the entrance/exit management system according to the first example embodiment. FIG. 14 is a sequence diagram illustrating an example of a system operation in a case where the visitor desires to retrieve the person to meet. It is assumed that the system user is registered in advance prior to the operation of FIG. 14.

When the visitor is positioned in front of the authentication terminal 10, the authentication terminal 10 acquires a face image of the visitor. The authentication terminal 10 transmits an authentication request including the face image to the server device 20 (step S01).

The server device 20 executes authentication processing (collation processing using the feature amount registered in the user database) using the acquired face image (step S11). The server device 20 transmits the result of the authentication process (authentication succeeded, authentication failed) to the authentication terminal 10.

In a case where the visitor desires to retrieve the person to meet, the authentication terminal 10 transmits a retrieval request including the name and the like of the person to meet to the server device 20 (step S02).

The server device 20 extracts the person to meet information from the retrieval request and specifies the position information of the person to meet using the user database and the entering person management database (step S12).

The server device 20 transmits a response (response to the retrieval request) including the specified position information to the authentication terminal 10 (step S13).

The authentication terminal 10 outputs information that clearly indicates the place of the person to meet using the acquired position information (outputs the position information of the person to meet; step S03).

As described above, in a case where the server device 20 according to the first example embodiment receives a retrieval request including the person to meet information (for example, the name) which is information for specifying the person to meet from the authentication terminal 10, the server device 20 specifies the relevant user ID from the user database using the person to meet information. The server device 20 acquires the position information of the person to meet from the entrance manager database using the specified user ID. The position information of the person to meet is transmitted to the authentication terminal 10 and is displayed such that the visitor can grasp the position of the person to meet. As a result, the visitor can easily grasp the position of the person the visitor desires to have a meeting with.

Second Example Embodiment

Next, a second example embodiment will be described in detail with reference to the drawings.

In the first example embodiment, a case where the authentication terminal 10 transmits the information of the person to meet to the server device 20 has been described. In the second example embodiment, a case where information related to a candidate of a person to meet is transmitted from the server device 20 to the authentication terminal 10 will be described.

In a case where the visitor desires to retrieve a person to meet, the authentication terminal 10 notifies the server device 20 of this desire. For example, the authentication terminal 10 transmits a retrieval request (empty retrieval request) that does not include the person to meet information to the server device 20. The empty retrieval request functions as a provision (transmission) request of the person to meet candidate from the authentication terminal 10 to the server device 20.

Upon receiving an empty retrieval request (a request for provision of a person to meet candidate), the server device 20 reads the name of the user ID stored in the entrance manager database from the user database.

The server device 20 transmits the read name (all the names of the users entering the free address floor) to the authentication terminal 10. The server device 20 transmits the read list of names to the authentication terminal 10 as a person to meet list (list in which candidates of person to meets are described).

Figure 15:
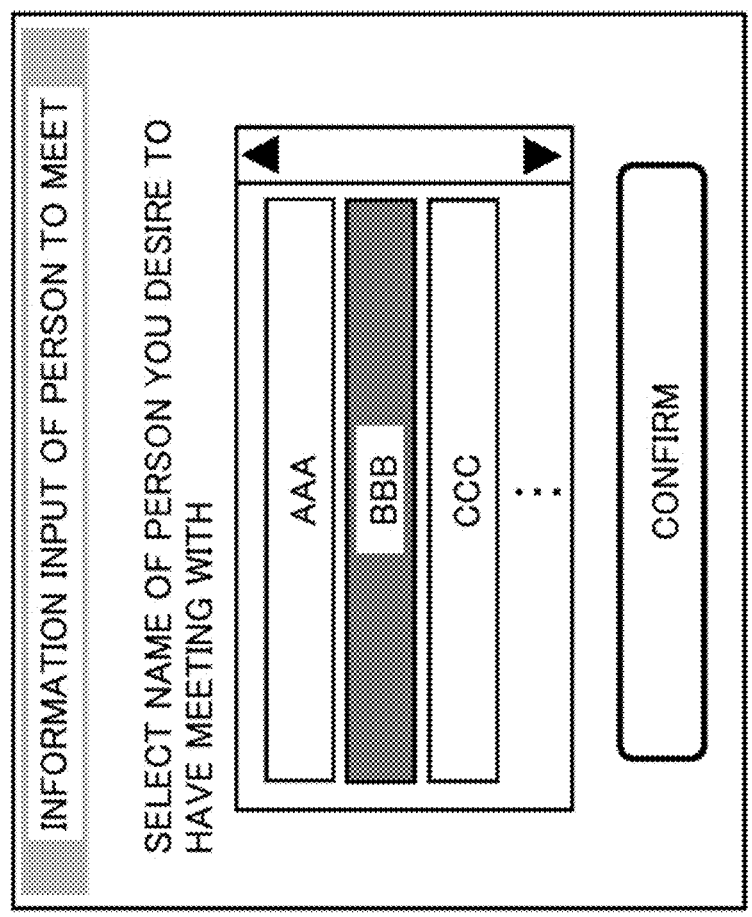
FIG. 15 is a diagram illustrating an example of display by an authentication terminal according to a second example embodiment.

The authentication terminal 10 receives the person to meet list and displays a list of the acquired names of the users. For example, the authentication terminal 10 performs display as illustrated in FIG. 15. The visitor selects the name of the person to meet according to the display illustrated in FIG. 15 and presses the "confirm button".

The authentication terminal 10 transmits the selected name to the server device 20.

The server device 20 transmits the face image, the position information, and the like relevant to the selected name to the authentication terminal 10.

The authentication terminal 10 displays the position information of the person to meet using the acquired position information (for example, display as illustrated in FIG. 5 is performed).

The configuration of the entrance/exit management system according to the second example embodiment can be the same as that of the first example embodiment, and thus the description relevant to FIG. 2 is omitted. Since the processing configurations of the authentication terminal 10 and the server device 20 according to the second example embodiment can be the same as those of the first example embodiment, the description thereof will be omitted.

The retrieval request unit 304 and the retrieval result output unit 305 of the authentication terminal 10 may enable the operation of the authentication terminal 10 described above. The retrieval request processing unit 205 of the server device 20 may enable the operation of the server device 20 described above.

Modification Example of Second Example Embodiment

When transmitting all the names of the users to the authentication terminal 10, the server device 20 may also transmit the face image and the position information of each person to the authentication terminal 10.

Figure 16:
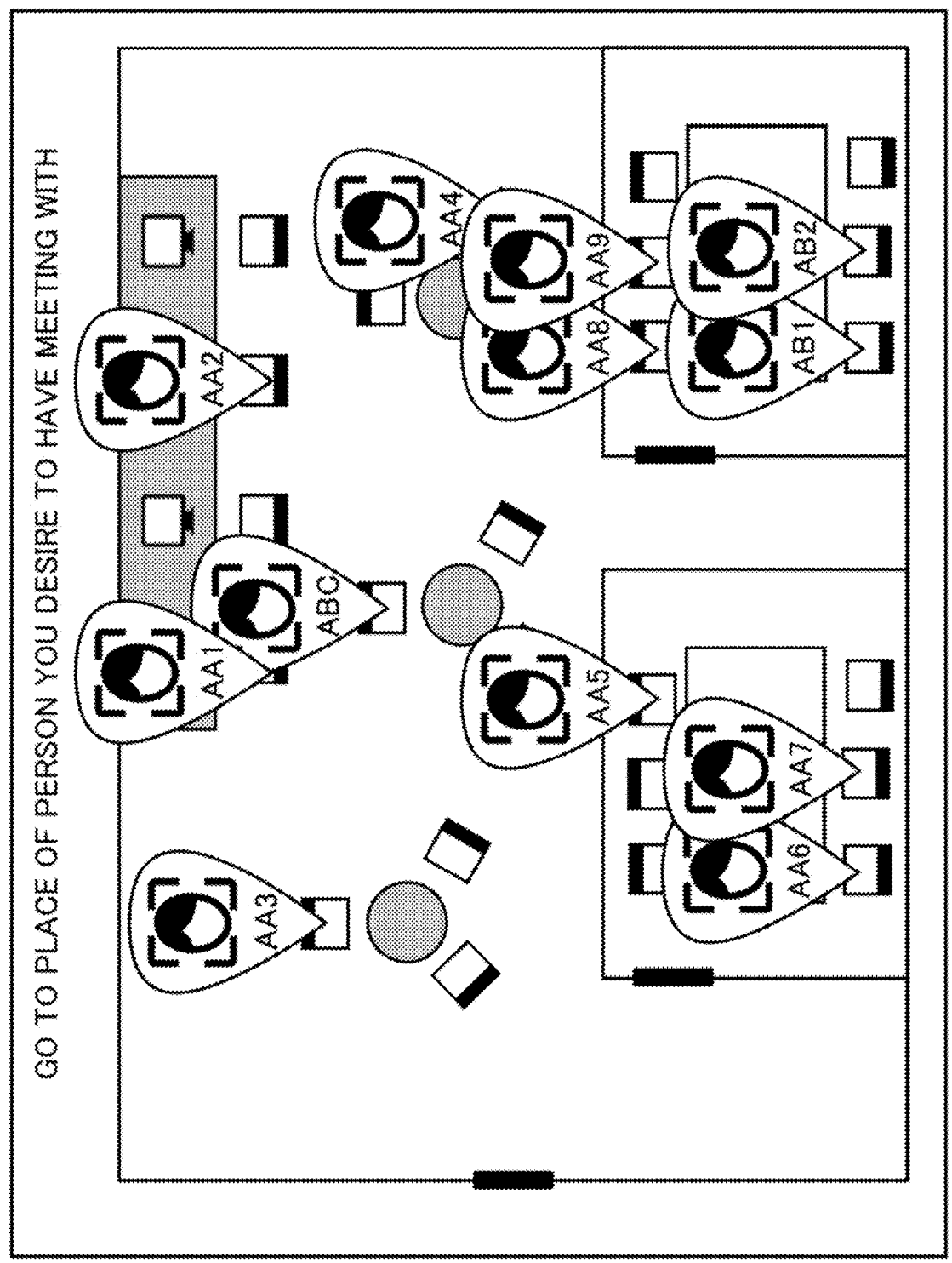
FIG. 16 is a diagram illustrating an example of display by the authentication terminal according to the second example embodiment.

In this case, the authentication terminal 10 may perform the display as illustrated in FIG. 16 instead of the display as illustrated in FIG. 15. The visitor who has contact with the display as illustrated in FIG. 16 can find a target person on the map and go to the place of the person. With such an interface, the visitor can go to the desired person without performing an operation of inputting the name of the person to meet.

As described above, the server device 20 according to the second example embodiment receives the retrieval request related to the position of the person to meet from the authentication terminal 10. The server device 20 that has received the retrieval request transmits a person to meet list including information (for example, the name of the entering person) for specifying at least one or more visitors registered in the entering person management database to the authentication terminal 10. The server device 20 acquires the position information of the entering person designated by the authentication terminal 10 according to the person to meet list from the entering person management database and transmits the acquired position information to the authentication terminal 10. As a result, the visitor does not need to input the name and the like of the person to meet and can more easily know the position of the visitor.

Third Example Embodiment

Next, a third example embodiment will be described in detail with reference to the drawings.

In the second example embodiment, a case where the names, names, and position information of all persons entering the free address floor are transmitted to the authentication terminal 10 has been described. In the entrance/exit management system according to the second example embodiment, in a case where the number of visitors to the floor is small, the visitor can easily select the person to meet. However, when the number of entering persons is large, it is difficult for the visitor to select a target person. In particular, in the display as described in the modification example of the second example embodiment (the display as illustrated in FIG. 16), a large number of markers are displayed, and the markers overlap each other. As a result, the visitor cannot easily find the target person.

In a third example embodiment, an entrance/exit management system that solves the above inconvenience will be described. When the server device 20 according to the third example embodiment receives a retrieval request (empty retrieval request; position information transmission request, provision request of person to meet candidate) from the authentication terminal 10, the server device 20 selects at least one or more candidates suitable for the visitor (candidates of the person to meet). The server device 20 transmits the name and the position information of the selected candidate to the authentication terminal 10.

For example, the server device 20 reads the department to which the visitor (the user who has performed the authentication process immediately before) belongs from the user database. Furthermore, the server device 20 refers to the user database and reads the department to which each user ID registered in the entering person management database belongs. The server device 20 reads the department to which the user entering the floor belongs from the user database.

The server device 20 compares the department to which the visitor belongs with the departments to which the visitors (all the visitors in the floor) belong and specifies the visitors with the same department. The server device 20 treats the specified entering person as a "person to meet candidate", and transmits the name, the face image, and the position information to the authentication terminal 10.

The authentication terminal 10 performs the display (for example, display as illustrated in FIGS. 15 and 16) described in the second example embodiment using the information acquired from the server device 10. As a result, information provided to the visitor is narrowed down, and the visitor can easily select a target person.

Figure 17:
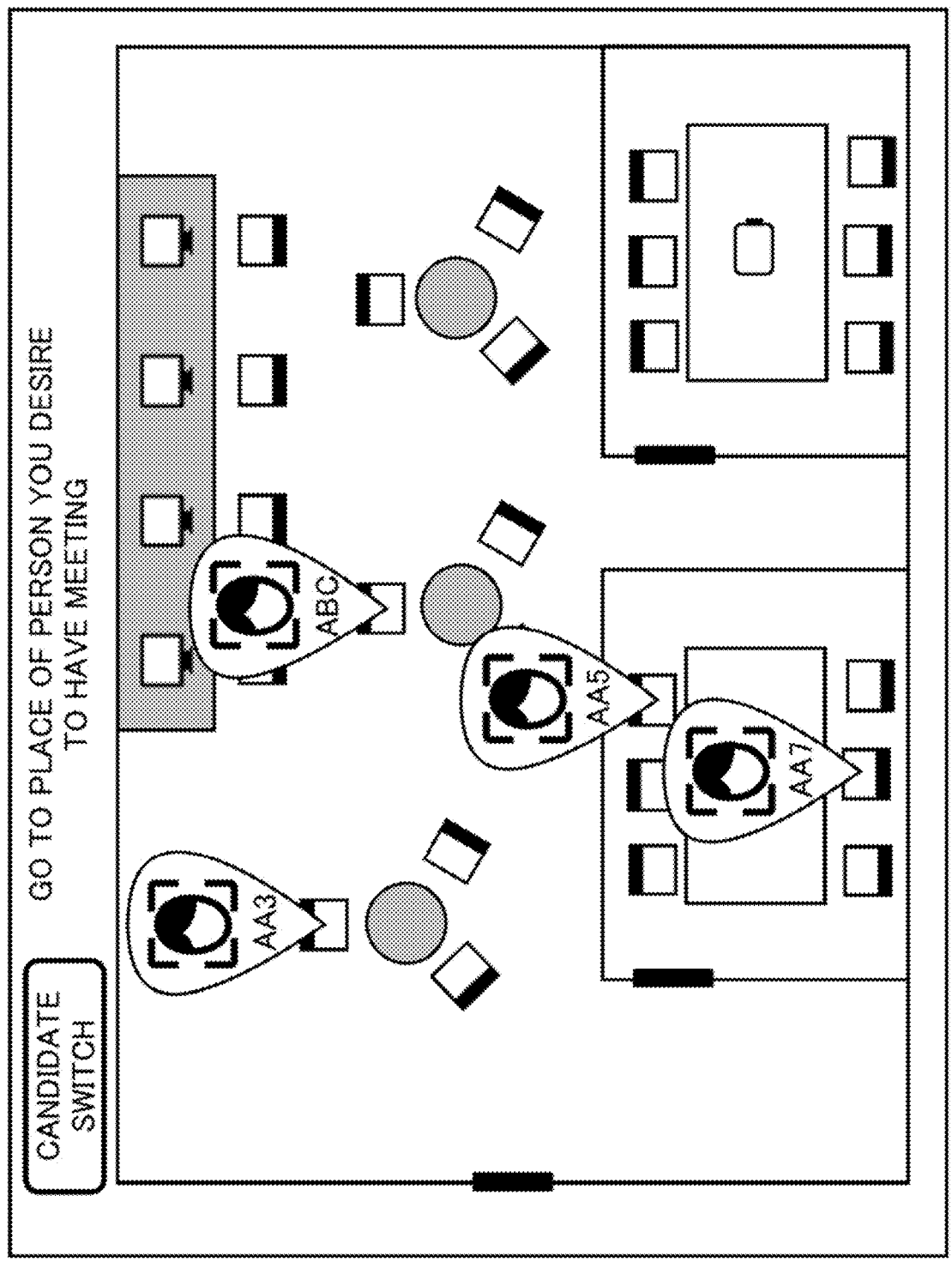
FIG. 17 is a diagram illustrating an example of display by an authentication terminal according to a third example embodiment.

However, selection of candidates for the person to meet by the server device 20 is not universal, and in some cases, a person desired by the visitor may not be selected as a candidate. In preparation for such inconvenience, the authentication terminal 10 desirably includes a "candidate switching button" as illustrated in FIG. 17.

When the candidate switching button is pressed, the authentication terminal 10 notifies the server device 20 of this fact. The server device 20 switches a criterion for selecting a candidate of the person to meet, and transmits the name, the position information, and the like of the new candidate to the authentication terminal 10. For example, the server device 20 may select (determine) a candidate for a person to meet based on the managerial position of the visitor. For example, the server device 20 performs a response such as selecting an entrance having a predetermined managerial position or higher as a candidate or selecting an entering person having the same managerial position as the candidate as a candidate.

The configuration of the entrance/exit management system according to the third example embodiment can be the same as that of the first example embodiment, and thus the description relevant to FIG. 2 is omitted. Since the processing configurations of the authentication terminal 10 and the server device 20 according to the third example embodiment can be the same as those of the first example embodiment, the description thereof will be omitted.

The retrieval request unit 304 and the retrieval result output unit 305 of the authentication terminal 10 may enable the operation of the authentication terminal 10 described above. The retrieval request processing unit 205 of the server device 20 may enable the operation of the server device 20 described above.

As described above, the server device 20 according to the third example embodiment receives the retrieval request related to the position of the person to meet from the authentication terminal 10. The server device 20 that has received the retrieval request selects at least one or more entering persons from a plurality of entering persons registered in the entering person management database. More specifically, the server device 20 selects a candidate for a person to meet to be provided to the authentication terminal 10 based on attributes of the visitor and the entering person (department to which the visitor or entering person belongs, managerial position, and the like). Thereafter, the server device 20 transmits a person to meet list including information (for example, the name) for specifying the selected one or more entering persons to the authentication terminal 10. The visitor can easily find the person to meet by narrowing down the person to meet candidates by the server device 20.

Fourth Example Embodiment

Next, a fourth example embodiment will be described in detail with reference to the drawings.

In the fourth example embodiment, a case where the server device 20 designates a condition for selecting a candidate for a person to meet from the authentication terminal 10 will be described.

The authentication terminal 10 provides an interface that enables the visitor to narrow down the person to meets based on a wide variety of information (conditions). For example, the authentication terminal 10 provides an interface that makes it possible to retrieve the person to meet based on the department to which the person to meet belongs, the time zone in which the person enters, the work state, and the like.

Figure 18:
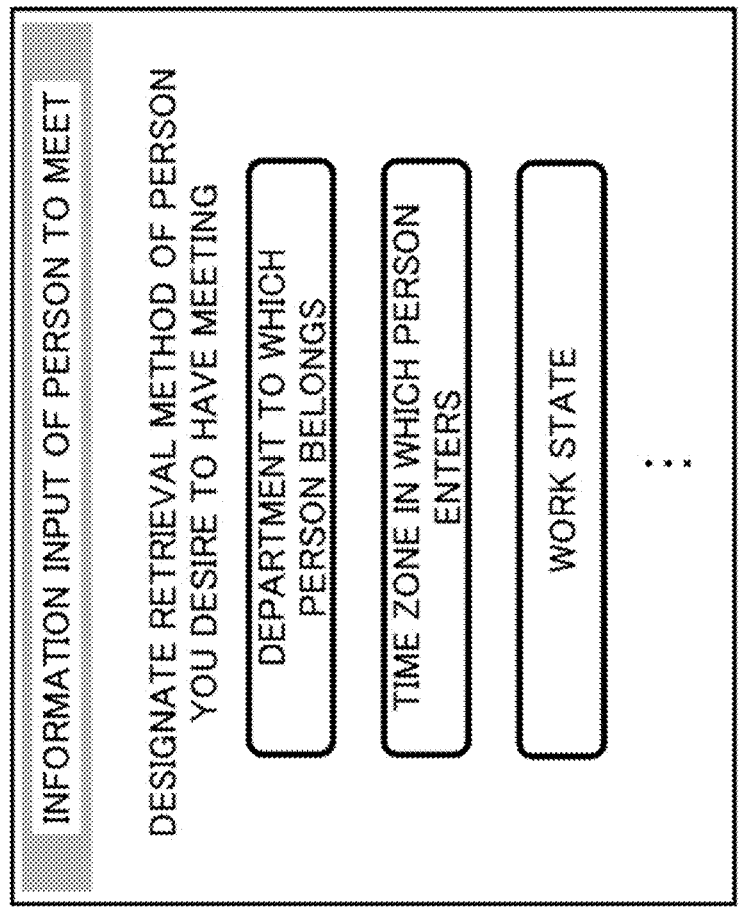
FIG. 18 is a diagram illustrating an example of display by an authentication terminal according to a fourth example embodiment.

For example, the authentication terminal 10 displays a screen as illustrated in FIG. 18 and acquires a retrieval method (retrieval condition) desired by the visitor. The authentication terminal 10 further provides an interface relevant to the acquired retrieval method. For example, in a case where the retrieval based on the department to which the visitor belongs is selected, the authentication terminal 10 displays a screen as illustrated in FIG. 19A. In a case where the retrieval based on the time zone in which the person enters is selected, the authentication terminal 10 displays a screen as illustrated in FIG. 19B. In a case where the retrieval based on the work state is selected, the authentication terminal 10 displays a screen as illustrated in FIG. 19C.

The display illustrated in FIGS. 18 or 19A-19C is an example, and various retrieval conditions can be input to the authentication terminal 10. For example, the authentication terminal 10 may provide the visitor with an interface that can designate a retrieval condition by a combination of a plurality of items. For example, the authentication terminal 10 may specify both the department to which the person to meet belongs and the time zone, and may be able to retrieve a person satisfying two conditions.

The authentication terminal 10 transmits a retrieval request including the retrieval method acquired via the GUI to the server device 20.

The server device 20 refers to the user database and the entering person management database, and specifies the entering person satisfying the acquired retrieval condition. For example, the server device 20 specifies an entering person having the same department to which the entering person belongs included in the retrieval request among the entering persons of the floor, and transmits the name, the face image, the position information, and the like of the specified entering person to the authentication terminal 10.

The authentication terminal 10 outputs information as illustrated in FIG. 15 or 16 based on the acquired information.

The configuration of the entrance/exit management system according to the fourth example embodiment can be the same as that of the first example embodiment, and thus the description relevant to FIG. 2 is omitted. Since the processing configurations of the authentication terminal 10 and the server device 20 according to the fourth example embodiment can be the same as those of the first example embodiment, the description thereof will be omitted.

The retrieval request unit 304 and the retrieval result output unit 305 of the authentication terminal 10 may enable the operation of the authentication terminal 10 described above. The retrieval request processing unit 205 of the server device 20 may enable the operation of the server device 20 described above.

As described above, the server device 20 according to the fourth example embodiment acquires the condition (for example, the department to which the entering person belongs, the time zone, and the work state) when selecting at least one or more entering persons among a plurality of entering persons (a plurality of entering persons registered in the entering person management database). The server device 20 transmits a person to meet list including information (for example, the name) for specifying the entering person selected based on the acquired condition to the authentication terminal 10.

Fifth Example Embodiment

Next, a fifth example embodiment will be described in detail with reference to the drawings.

In the fifth example embodiment, a case where the server device 20 controls the conference room terminal 11 will be described. The conference room terminal 11 controls a conference room of the user.

A user who uses the conference room (a person entering the free address floor) reserves the conference room in advance. The conference room user inputs conference room reservation information (for example, the name, the employee number, the meeting room to be reserved, the use time, and the like) to the server device 20. The conference user inputs names, employee numbers, and the like of another participant attending the conference to the server device 20. Alternatively, the another participant may input his or her own name and the like to the server device 20.

When the conference room user moves in front of the conference room terminal 11, the conference room terminal 11 acquires biometric information (face image) of the user and transmits the biometric information to the server device 20. The server device 20 performs collation using the acquired biometric information, and when the authentication is successful, the server device 20 notifies the conference room terminal 11 of this fact. The conference room terminal 11 that has received the notification opens the relevant gate 40 and permits the authenticated person to use the conference room.

The configuration of the entrance/exit management system according to the fifth example embodiment can be the same as that of the first example embodiment, and thus the description relevant to FIG. 2 is omitted. Hereinafter, differences between the first to fifth example embodiments will be mainly described.

[Server Device]

Figure 20:
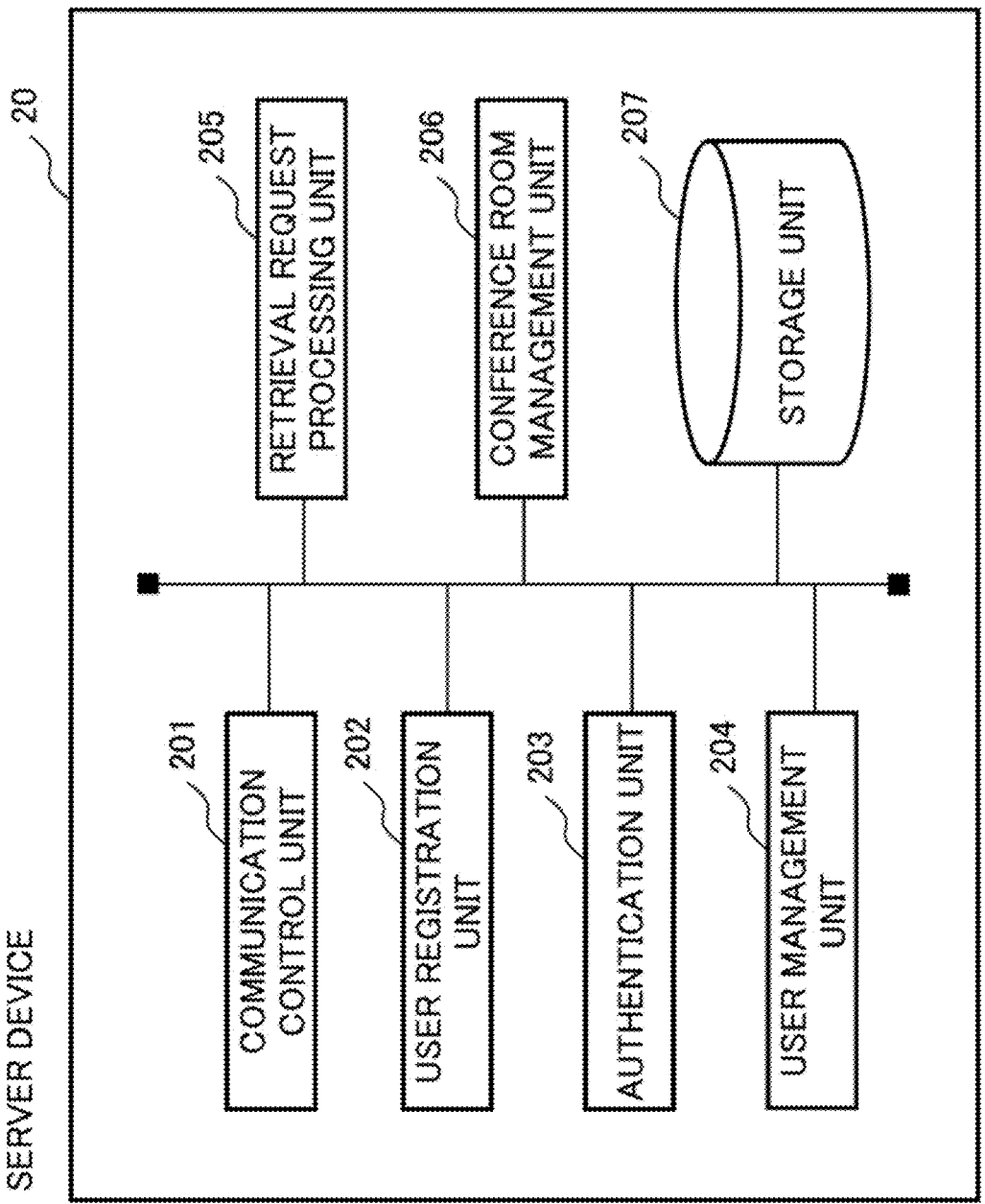
FIG. 20 is a diagram illustrating an example of a processing configuration of a server device according to a fifth example embodiment.

FIG. 20 is a diagram illustrating an example of a processing configuration (processing module) of the server device 20 according to the fifth example embodiment. In the server device 20 according to the fifth example embodiment, a conference room management unit 207 is added to the server device 20 according to the first example embodiment.

The conference room management unit 207 is means configured to manage the conference room in the free address floor. The conference room management unit 207 acquires conference room reservation information by the user by any means. For example, the conference room management unit 207 displays a form for inputting the conference room reservation information on the terminal of the user and acquires the conference room reservation information.

The conference room management unit 207 refers to the user database and specifies the user ID based on information for specifying the subscriber such as the name and the employee number of the subscriber from the acquired conference room reservation information. In a case where the subscriber also inputs the name and the like of another participant, the conference room management unit 207 specifies the user ID of the another participant. The conference room management unit 207 associates the specified user ID, the conference room to be used, the use time, and the like, and adds the associated information to the conference room management database.

For example, the conference room management unit 207 manages conference rooms by using a conference room management database as illustrated in FIG. 21. Referring to FIG. 21, it is understood that the users of ID01 to ID03 use a conference room A.

When acquiring the biometric information (face image) from the conference room terminal 11, the authentication unit 203 performs collation processing using the biometric information and the feature amount registered in the user database. The authentication unit 203 determines whether the user ID specified by the collation processing is registered in the conference room management database.

When the user ID is registered in the database, the authentication unit 203 notifies the conference room management unit 207 of "conference room use is permitted". When the user ID is not registered in the database, the authentication unit 203 transmits "conference room use is not permitted" to the conference room management unit 207.

When acquiring the authentication result (conference room use is permitted, conference room use is not permitted), the conference room management unit 207 transmits the result to the conference room terminal 11 (the conference room terminal 11 which is a transmission source of the biometric information).

The conference room management unit 207 transmits detailed information of the conference to the conference room terminal 11. The detailed information of the conference is information including information (for example, the name) related to participants in the conference held in the conference room, a use time of the conference, and the like. The conference room management unit 207 generates the conference detailed information by referring to the user database and the conference room management database.

[Conference Room Terminal]

Figure 22:
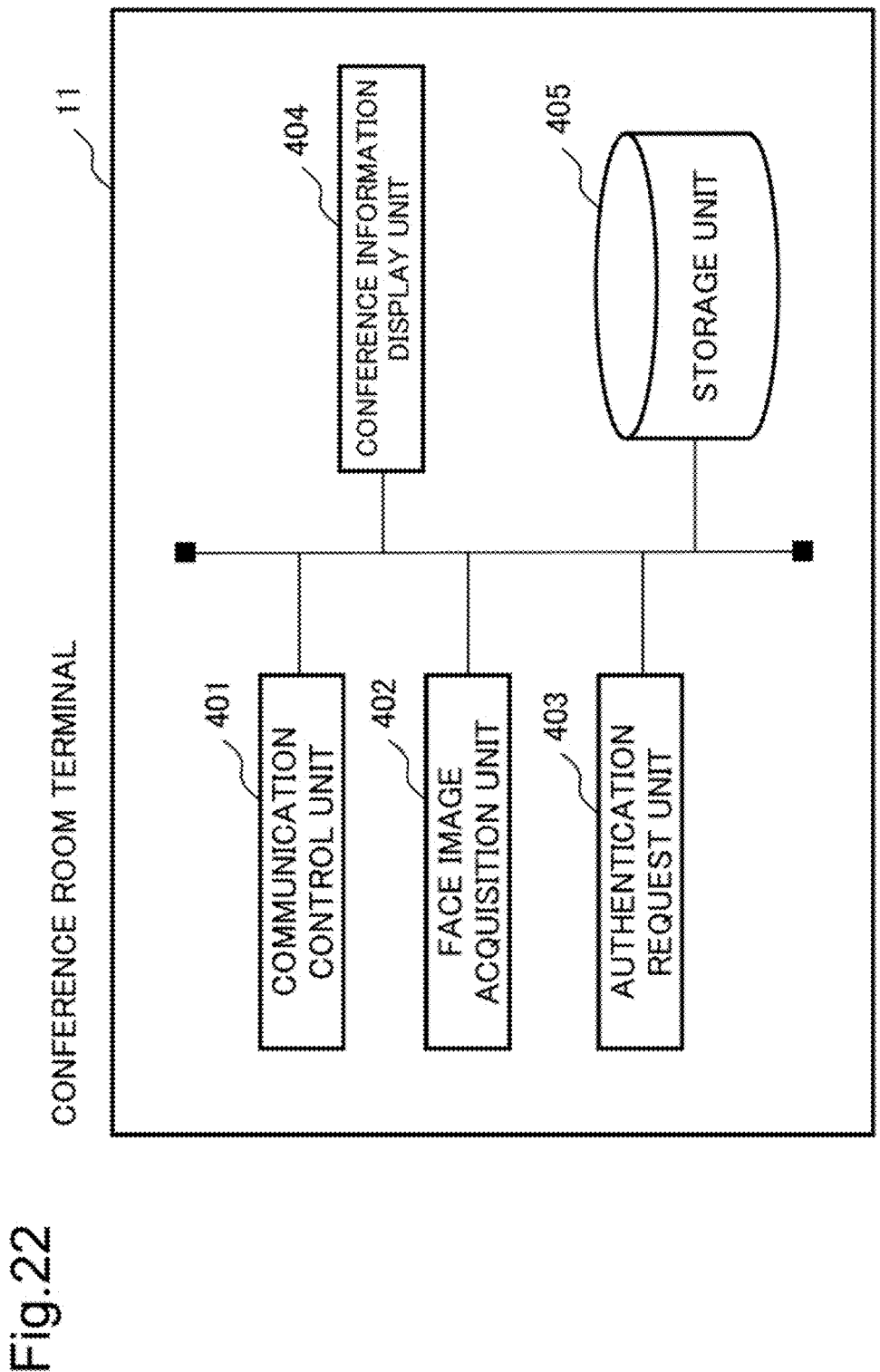
FIG. 22 is a diagram illustrating an example of a processing configuration of a conference room terminal according to the fifth example embodiment.

FIG. 22 is a diagram illustrating an example of a processing configuration (processing module) of the conference room terminal 11 according to the fifth example embodiment. Referring to FIG. 22, the conference room terminal 11 includes a communication control unit 401, a face image acquisition unit 402, an authentication request unit 403, a conference information display unit 404, and a storage unit 405.

The communication function, the biometric information acquisition function, and the authentication (authentication request) function of the conference room terminal 11 can be the same as the relevant functions of the authentication terminal 10, and thus the description of the communication control unit 401 and the like is omitted.

The conference information display unit 404 is means configured to acquire conference detailed information from the server device 20 and performing display based on the information. For example, the conference information display unit 404 performs display as illustrated in FIG. 23. FIG. 23 is an example, and the conference information display unit 404 can perform various displays. For example, in a case where the subscriber inputs "the purpose of the conference" or "the agenda of the conference" as the conference room reservation information, the server device 20 transmits the information to the conference room terminal 11. The conference room terminal 11 may add these pieces of information to the display illustrated in FIG. 23.

As described above, in the fifth example embodiment, the server device 20 transmits the conference detailed information to the conference room terminal 11. Since the conference room terminal 11 can display participants, intents, and the like of the conference based on the information, visitors to the floor can also jump in and participate in the conference. In this case, the user who desires to participate in the conference inputs conference room reservation information to the server device 20. Alternatively, the user who desires to participate in the conference may knock on the door of the conference room, and the participant of the conference may open the gate 40 from the inside. As described above, in the fifth example embodiment, since the details of the conference are notified to those other than the conference participants, the users on the floor can easily participate in the conference (suddenly participate in the conference).

Sixth Example Embodiment

Next, a sixth example embodiment will be described in detail with reference to the drawings.

In the first to fifth example embodiments, the case where the authentication terminal 10 provides information to a visitor and receives an operation by the input/output device in which the liquid crystal panel and the touch panel are integrated has been described. However, display or the like using a device as described above may cause a problem regarding privacy of a visitor.

In a sixth example embodiment, a case where protection regarding privacy of a user is enhanced will be described.

The authentication terminal 10 according to the sixth example embodiment uses an input/output device called an aerial imaging (AI) plate or an aerial display to display information or receive an operation of a visitor.

The AI plate (aerial display) is a device capable of aerial image formation. The aerial display allows a video (light) to pass through a special panel made of glass, resin, or the like to form a real image in the air at an equal distance on the opposite side of the real image. The user positioned at a predetermined place with respect to the aerial display can feel as if the video floats in the air. By combining the aerial display and the distance measuring sensor, it is also possible to input an operation using a display floating in the air. In other words, the authentication terminal 10 detects the spatial position of the fingertip using the distance measuring sensor and detects that the relevant display operation has been input.

The authentication terminal 10 enables a GUI provided to a visitor using a device as described in Reference Literature 1 or Reference Literature 2 below.

Figure 24:
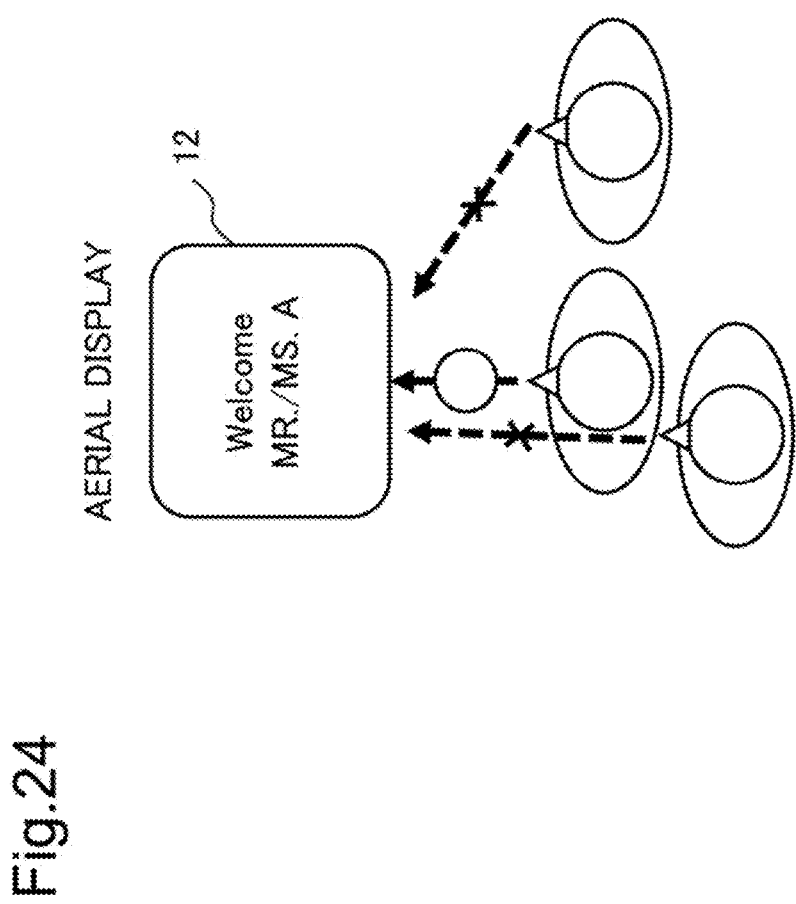
FIG. 24 is a diagram for describing an aerial display according to a sixth example embodiment.
Figure 25A:
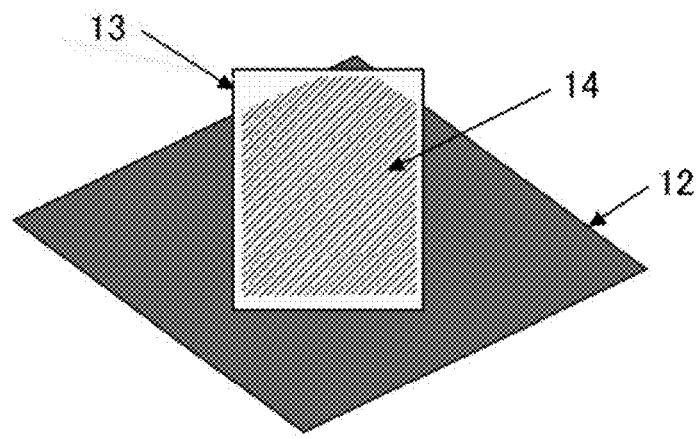
FIGS. 25A and 25B are diagrams for describing the aerial display according to the sixth example embodiment.
Figure 25B:
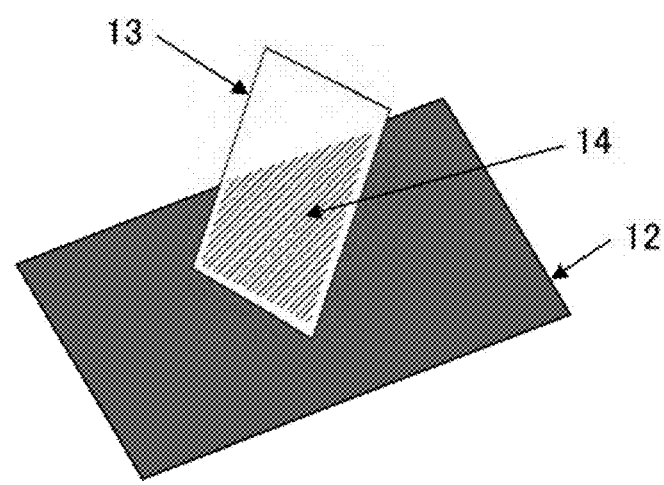

<Reference Literature 1>
  URL: https://www.assist-corp.tv/vision
<Reference Literature 2>
  URL: https://www.asukanet.co.jp/contents/product/aeri-alimaging.html The input/output devices described in Reference Literature 1 and 2 are configured to allow a visitor positioned at a predetermined distance to visually recognize the display. However, as illustrated in FIG. 24, a person standing behind or beside the person operating the device (the aerial display 12) cannot know the display content. More specifically, the user can visually recognize the content (display content) as a hologram only in a region where the aerial display 12 physically exists. Therefore, as illustrated in FIG. 25A, when the user is positioned in front of the aerial display 12, the overlapping region between the aerial display 12 and a hologram display surface 13 becomes a visible region 14. Therefore, the user can visually recognize most of the content. On the other hand, as illustrated in FIG. 25B, when the user is positioned on the side (right side) of the aerial display 12, the overlapping region between the aerial display 12 and the hologram display surface 13 is reduced. Therefore, the user can hardly visually recognize details of the content.

In the first to fifth example embodiments, the case where the retrieval request unit 304 controls the opening and closing of the gate 40-1 according to the authentication result from the server device 20 in consideration of the case where the visitor desires to retrieve the person to be visited has been described. However, in a case where the retrieval of the person to be visited by the visitor is not implemented, the authentication request unit 303 may control opening and closing of the gate 40-1. In this case, the retrieval result output unit 305 may perform display based on the authentication result on the aerial display. For example, the retrieval result output unit 305 outputs a message welcoming the visitor to the aerial display.

Alternatively, in a case where the retrieval of the person to be visited is enabled by the visitor, the retrieval request unit 304 may control opening and closing of the gate 40-1. In other words, in a case where authentication using biometric authentication by the server device 20 and authentication using another authentication method by a gesture or the like are both successful, the retrieval request unit 304 may immediately open the gate 40-1 when the visitor does not desire to retrieve the person to be visited. In a case where the visitor desires to retrieve a person to be visited, the retrieval request unit 304 may open the gate 40-1 after displaying the person to meet.

As described above, in the entrance/exit management system according to the sixth example embodiment, the authentication terminal 10 requests an authentication process using the biometric information of the user by the server device 20 and controls the opening and closing of a gate in accordance with the authentication result acquired from the server device 20. The authentication terminal 10 outputs displayed information based on the authentication result to an aerial display. Since the authentication terminal 10 outputs the displayed information based on the authentication result (for example, displayed information using a message indicating the name of the visitor and welcoming the visitor) to the aerial display, a third party other than the visitor cannot recognize the display. As a result, the privacy of the visitor is suitably protected.

Seventh Example Embodiment

Next, a seventh example embodiment will be described in detail with reference to the drawings.

In the first to sixth example embodiments, the authentication terminal 10 permits the visitor to enter the floor when the biometric authentication (face authentication) of the visitor is successful. In the seventh example embodiment, a case where a visitor is permitted to enter when authentication by another authentication method (an authentication method different from the biometric authentication) is successful in addition to the biometric authentication will be described.

Specifically, the authentication terminal 10 permits a visitor to enter when the system user inputs predetermined information. Examples of the predetermined information include gestures, numbers, characters, and combinations thereof. In the seventh example embodiment, a case where a gesture is input to the server device 20 in advance will be described.

Figure 26:
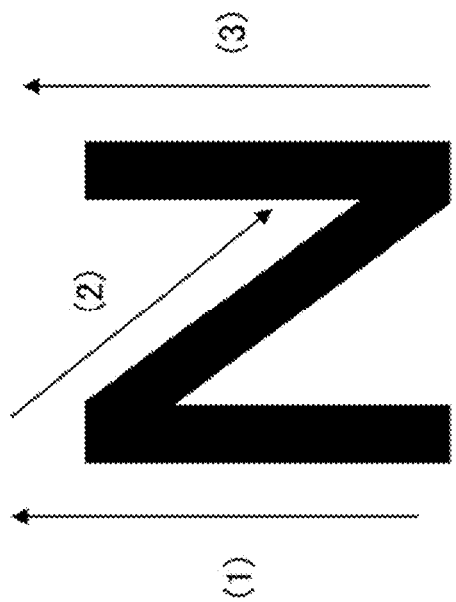
FIG. 26 is a diagram for describing an operation of an authentication terminal according to a seventh example embodiment.

In advance preparation, gestures are registered in the server device 20 together with the face image and the profile information. For example, the user inputs a gesture of tracing the shape of the character "N" as illustrated in FIG. 26. The server device 20 stores the motion of the gesture illustrated in FIG. 26, for example, the motion of the fingertip moving in the order of (1) to (3). The server device 20 stores the gesture in the user database.

When the face authentication is successful, the server device 20 transmits the gesture registered together with the authentication result to the authentication terminal 10. In the example of FIG. 26, the fingertip moves from the bottom to the top, moves obliquely to the lower right from the top, and locus information moving from the bottom to the top is transmitted to the authentication terminal 10.

Figure 27:
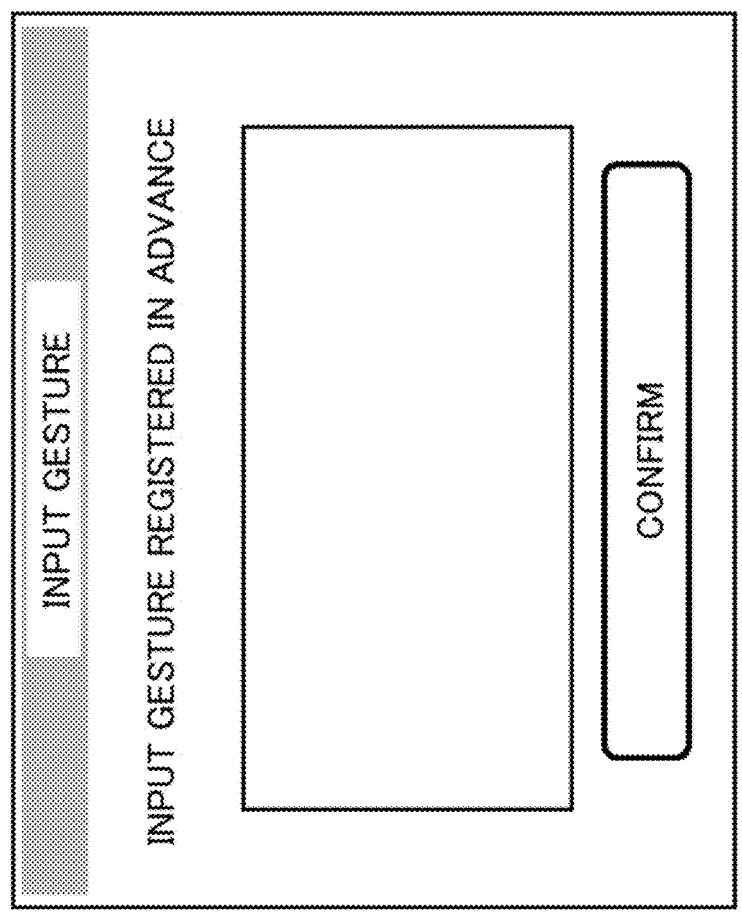
FIG. 27 is a diagram illustrating an example of display by the authentication terminal according to the seventh example embodiment.

The authentication terminal 10 instructs the visitor of which the face authentication was successful to input a gesture registered in advance (refer to FIG. 27). When the authentication terminal 10 displays the locus of the visitor tracing the display with the fingertip and the confirm button is pressed, the acquisition of the gesture is completed.

When the gesture acquired from the server device 20 matches the gesture input by the visitor, the authentication terminal 10 determines that the second-stage authentication (second-factor authentication) was successful. When the gesture acquired from the server device 20 does not match the gesture input by the visitor, the authentication terminal 10 determines that the second-stage authentication (second-factor authentication) has failed.

The authentication terminal 10 permits the visitor to enter when two authentications (biometric authentication, authentication by gesture) are successful. When any one of the two authentications (biometric authentication, authentication by gesture) has failed, the authentication terminal 10 does not permit the visitor to enter.

As described above, the authentication request unit 303 of the authentication terminal 10 controls the gate 40-1 to open when the authentication result acquired from the server device 20 is successful and the authentication by the authentication method different from the biometric information is successful. The authentication method different from the biometric information is, for example, authentication using information predetermined by the user. In particular, the authentication terminal 10 performs authentication by a gesture predetermined by the system user.

The authentication terminal 10 may change information to be provided to the visitor at the time of authentication by a gesture. For example, the authentication terminal 10 may display a part of the gesture acquired from the server device 20 in advance and instruct to input the remaining gestures. For example, in a case where the shape of "N" is registered as a gesture, the authentication terminal 10 may perform a display as illustrated in FIG. 28A or 28B.

Figure 28A:
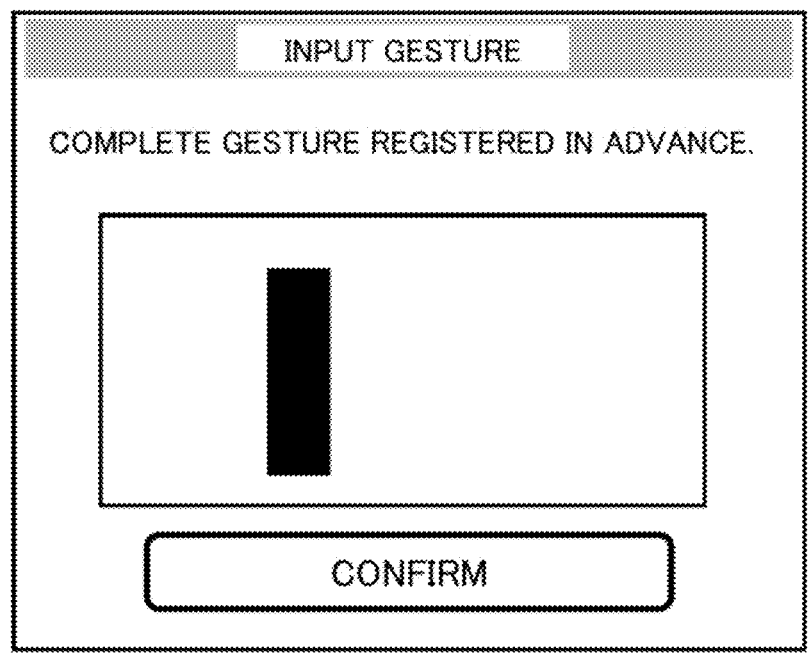
FIGS. 28A and 28B are diagrams illustrating an example of display by the authentication terminal according to the seventh example embodiment.
Figure 28B:
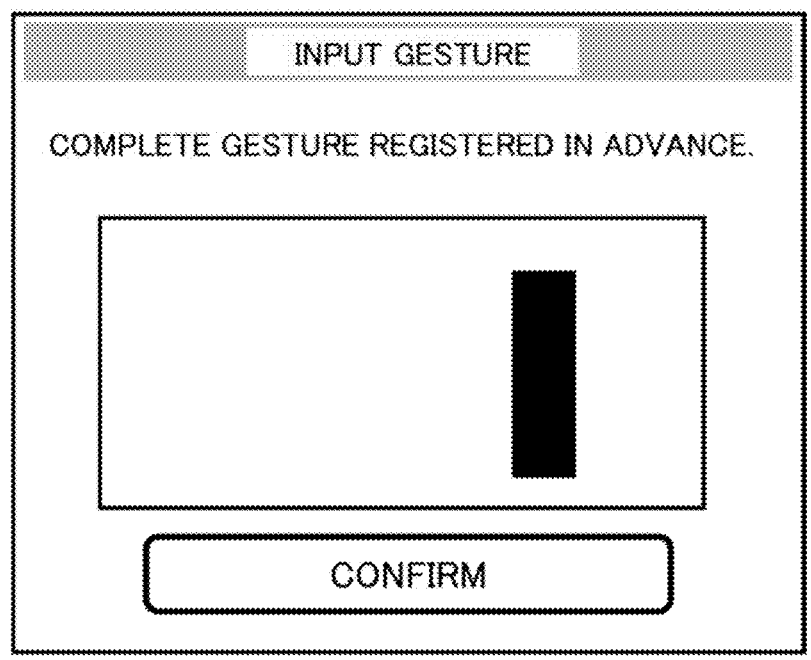

In FIG. 28A, a straight line on the left side of the character "N" is displayed, and an instruction to input the remaining gesture is given. In FIG. 28B, a straight line on the right side of the character "N" is displayed, and an instruction to input the remaining gesture is given.

In this manner, the authentication terminal 10 displays one part of the gesture used for the second-stage authentication. Furthermore, control is performed such that the gate 40-1 is opened in a case where the user (visitor) completes another part of the gesture in which the authentication terminal 10 and the one part thereof are displayed.

In a case where the authentication terminal 10 permits the visitor to enter, the authentication terminal 10 may take a measure such that the visitor can recognize (understand) the permission. For example, a character predetermined by a visitor (system user) may be displayed on the aerial display. The system user inputs the character to the server device 20 in advance preparation. The server device 20 transmits information on the character (for example, image data of a character) to the authentication terminal 10 together with the result of authentication using the biometric information. When the biometric authentication or the two-factor authentication is successful, the authentication terminal 10 displays the character on the aerial display. The character can be a character which is referred to as a so-called avatar (other self of the user) or a persona (virtual person defined by the user).

As described above, in the entrance/exit management system according to the seventh example embodiment, the entrance and exit of the visitor is managed by the second authentication using other information (for example, a gesture) in addition to the first authentication using the biometric information. As a result, security of the entrance/exit system is improved. In two-factor authentication using biometric information and gestures, a third party (for example, a visitor beside or after the visitor) other than a visitor can recognize gestures. However, since the authentication terminal 10 according to the seventh example embodiment adopts a method in which a part of the gesture is displayed and the visitor inputs the remaining gesture, the third party cannot know the gesture determined by the visitor. In other words, by displaying a part of the gestures and allowing the visitor to complete the remaining gestures, the security of the system can be further strengthened.

Figure 29:
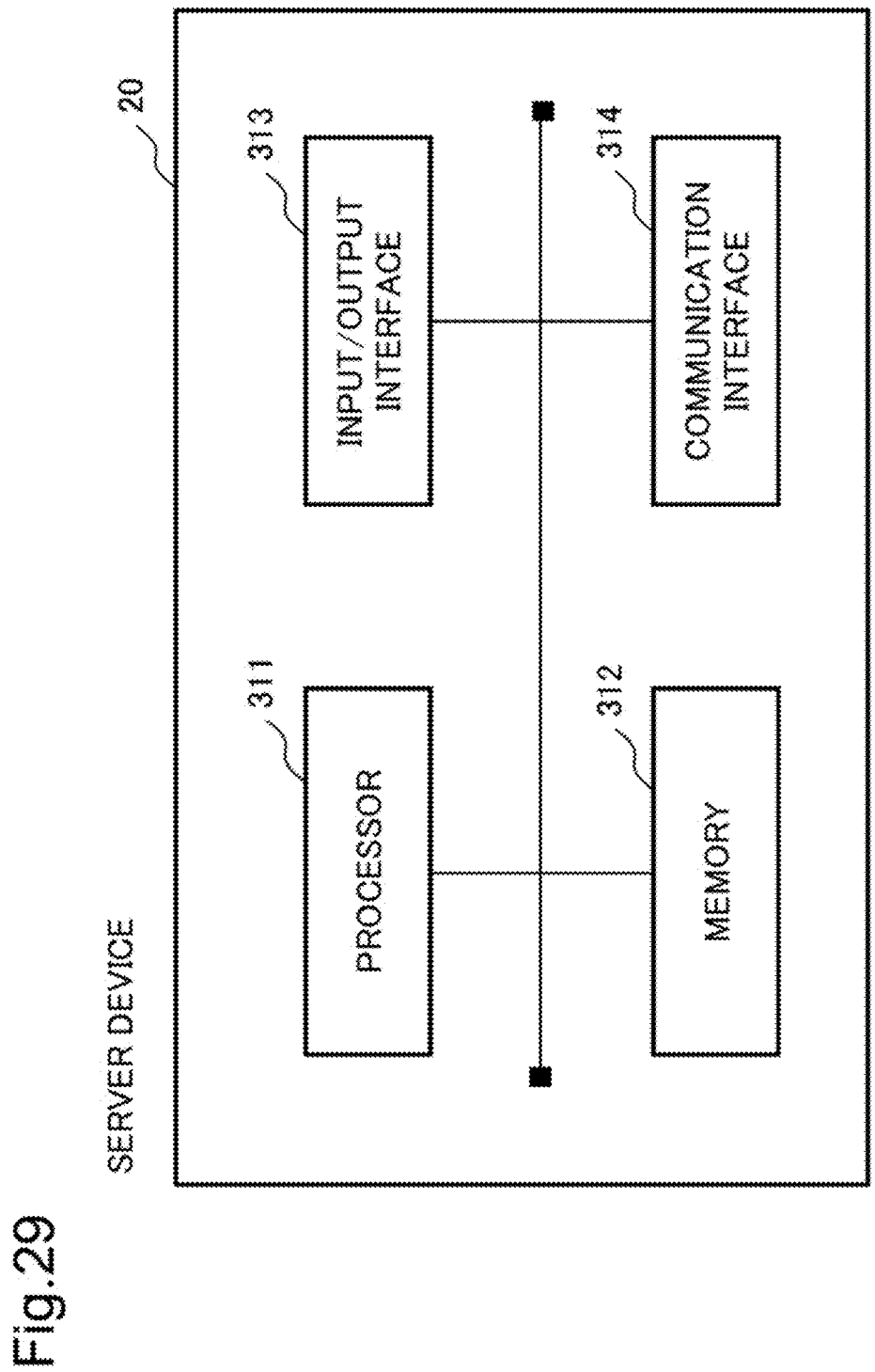
FIG. 29 is a diagram illustrating an example of a hardware configuration of a server device.

Next, hardware of each device constituting the entrance/exit management system will be described. FIG. 29 is a diagram illustrating an example of a hardware configuration of the server device 20.

The server device 20 can be configured by an information processing device (so-called computer), and has the configuration illustrated in FIG. 29. For example, the server device 20 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 29 is not intended to limit the hardware configuration of the server device 20. The server device 20 may include hardware (not illustrated) or may not include the input/output interface 313 as necessary. The number of processors 311 and the like included in the server device 20 is not limited to the example of FIG. 29, and for example, a plurality of processors 311 may be included in the server device 20.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various programs including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The functions of the server device 20 are enabled by various processing modules. The processing module is enabled, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. In other words, the present invention can also be embodied as a computer program product. The program can be downloaded via a network or updated using a storage medium storing the program. Furthermore, the processing module may be enabled by a semiconductor chip.

The authentication terminal 10 and the conference room terminal 11 can also be configured by an information processing device similarly to the server device 20, and since there is no difference in the basic hardware configuration from the server device 20, the description thereof will be omitted. For example, the authentication terminal 10 may include a camera device, a liquid crystal display, or the like.

In particular, the authentication terminal 10 according to the sixth and seventh example embodiments may include an "aerial display" as disclosed in Reference Literature 1 and 2.

The server device 20 is equipped with a computer, and the function of the server device 20 can be enabled by causing the computer to execute a program. The server device 20 executes the entrance/exit management method by the program.

Modification Example

The configuration, operation, and the like of the entrance/exit management system described in the above example embodiment are merely examples and are not intended to limit the configuration and the like of the system.

The profile of the system user (attribute value of the user) may be input using a scanner or the like. For example, the user inputs an image related to his or her business card to the server device 20 using a scanner. The server device 20 executes optical character recognition (OCR) processing with respect to the acquired image. The server device 20 may determine the profile of the user based on the obtained information.

In the above example embodiment, a case where the biometric information related to the "face image" is transmitted from the authentication terminal 10 and the conference room terminal 11 to the server device 20 has been described. However, the biometric information related to "the feature amount generated from the face image" may be transmitted from the authentication terminal 10 or the like to the server device 20. The server device 20 may execute the collation processing with the feature amount registered in the user database using the acquired feature amount (feature vector).

In the above example embodiment, a case where the server device 20 selects the person to meet candidate based on the retrieval condition input by the visitor has been described. However, the server device 20 may select the person to meet candidate based on information obtained from a device or the like of another server. For example, in a case where an e-mail transmission history or the like can be acquired from the mail server, the server device 20 may select the user who transmits and receives the e-mail to and from the visitor as the person to meet candidate. With such a response, users who are transmitting and receiving e-mails may be connected to induce an accidental conversation.

Alternatively, the server device 20 may select the person to meet candidate using the conference room reservation information. For example, the server device 20 may select a person who is scheduled to have a meeting with a visitor as a person to meet candidate. Alternatively, the server device 20 may select a person relevant to a supervisor or a subordinate of the visitor as the person to meet candidate.

The server device 20 may also display other information in addition to the name, face image, and the like of the person to meet. For example, the server device 20 may estimate the time when the person to meet arrives at the free address floor from the conference room reservation information, and display information such as the arrival time and how many minutes later the person to meet arrives at the floor.

Alternatively, the server device 20 may notify the person to meet of the presence of the visitor. Specifically, in a case where the server device 20 acquires the retrieval request including the name and the like of the person to meet from the visitor via the authentication terminal 10, the server device 20 may transmit an e-mail notifying the presence of the visitor to the person to meet.

In the above example embodiment, the case where the authentication terminal 10 controls entrance to the free address floor has been described. However, the application of the authentication terminal 10 is not limited to the case of controlling entrance to the free address floor. For example, the authentication terminal 10 may be used for the purpose of restricting entrance to an event venue, an exhibition, or the like. In other words, the authentication terminal 10 may be a terminal that performs two-factor authentication when entering the floor or may be a terminal that makes payment through face authentication (for example, face authentication self-checkout).

The authentication terminal 10 and the gate 40 described in the present disclosure can also be used to manage entrance and exit of a plurality of persons. For example, when a plurality of persons passes through the authentication terminal 40 and the gate 40 at the same time (substantially at the same time), it is possible to explicitly transmit the fact that the person is authenticated in the authentication only to the person himself or herself (person to be authenticated). In other words, the authentication terminal 10 including the aerial display can transmit the authentication result only to the person himself or herself.

In the above example embodiment, a case where the server device 20 transmits the names and the like of the participants participating in the conference to the conference room terminal 11 as the conference detailed information has been described. However, the server device 20 may change the conference detailed information to be transmitted based on the attribute of the participant participating in the conference. Alternatively, the server device 20 may change the content of the conference detailed information according to the person standing in front of the conference room terminal 11. Alternatively, the content of the conference detailed information may be changed, or display availability may be determined according to the attribute of the user (for example, the division to which the user belongs, and the like). In this manner, regarding the conference detailed information, whether the display content can be displayed may be determined by the attribute of the user (display control is enabled by authentication information such as a face image).

When detecting that the person who has made the reservation of the conference room enters the conference room based on the conference room reservation information, the server device 20 may transmit an e-mail or the like to the remaining participants.

In the above example embodiment, two-factor authentication using gestures has been described. When inputting the gesture, instead of inputting a gesture using a fingertip, the gesture can also be input by detecting movement of a line of sight. By inputting the gesture by the line of sight, a third party (for example, other visitors positioned behind the visitor) other than the visitor cannot know the content of the gesture.

In the above example embodiment, the case where the security is enhanced by displaying a part of the gesture has been described. In the entrance/exit management system, security may be enhanced by randomly displaying a numeric keypad.

In the flowchart (flowchart and sequence diagram) used in the above description, a plurality of steps (processes) is described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiments have been described in detail in order to facilitate understanding of the present disclosure, and it is not intended that all the configurations described above are necessary. In a case where a plurality of example embodiments has been described, each example embodiment may be used alone or in combination. For example, a part of the configuration of an example embodiment can be replaced with the configuration of another example embodiment, and the configuration of another example embodiment can also be added to the configuration of the example embodiment. Furthermore, it is also possible to add, remove, or replace other configurations with respect to a part of the configuration of the example embodiment.

Although the industrial applicability of the present invention is apparent from the above description, the present invention can be suitably applied to an entrance/exit management system or the like performed at a free address floor of a company or the like.

Some or all of the above example embodiments may be described as the following supplementary notes but are not limited to the following.

[Supplementary Note 1]

An authentication terminal including:
  an acquisition unit that acquires biometric information of a user;
  an authentication request unit that requests a server device for an authentication process using the biometric information of the user, and controls opening/closing of a gate in accordance with an authentication result acquired from the server device; and
  an output unit that outputs displayed information based on the authentication result to an aerial display with which it is possible for a person at a prescribed position to visually recognize the displayed information based on the authentication result.

[Supplementary Note 2]

The authentication terminal according to Supplementary Note 1, in which the authentication request unit controls to open the gate when the authentication result acquired from the server device is successful and the authentication by an authentication method different from authentication by the biometric information is successful.

[Supplementary Note 3]

The authentication terminal according to Supplementary Note 2, in which the authentication method different from authentication by the biometric information is authentication using information predetermined by the user.

[Supplementary Note 4]

The authentication terminal according to Supplementary Note 2 or 3, in which the authentication method different from authentication by the biometric information is authentication using a gesture by the user.

[Supplementary Note 5]

The authentication terminal according to Supplementary Note 4, in which
  the output unit displays one part of the gesture, and
  the authentication request unit controls to open the gate when the user completes another part of the gesture of which the one part is displayed.

[Supplementary Note 6]

The authentication terminal according to any one of Supplementary Notes 2 to 5, in which the output unit displays a character predetermined by the user on the aerial display when authentication by the authentication method different from authentication by the biometric information is successful.

[Supplementary Note 7]

An entrance/exit management system including:
a server device that performs authentication using biometric information; and
an authentication terminal, in which
the authentication terminal includes
an acquisition unit that acquires biometric information of a user,
an authentication request unit that requests the server device for an authentication process using the biometric information of the user, and controls opening/closing of a gate in accordance with an authentication result acquired from the server device, and
an output unit that outputs displayed information based on the authentication result to an aerial display with which it is possible for a person at a prescribed position to visually recognize the display based on the authentication result.

[Supplementary Note 8]

The entrance/exit management system according to Supplementary Note 7, in which the authentication request unit controls to open the gate when the authentication result acquired from the server device represents success and the authentication by an authentication method different from authentication by the biometric information is successful.

[Supplementary Note 9]

The entrance/exit management system according to Supplementary Note 8, in which the authentication method different from authentication by the biometric information is authentication using information predetermined by the user.

[Supplementary Note 10]

The entrance/exit management system according to claim 7 or 8, wherein the authentication method different from authentication by the biometric information is authentication using a gesture by the user.

[Supplementary Note 11]

The entrance/exit management system according to Supplementary Note 10, in which
the output unit displays one part of the gesture, and
the authentication request unit controls to open the gate when the user completes another part of the gesture of which the one part is displayed.

[Supplementary Note 12]

The entrance/exit management system according to any one of Supplementary Notes 8 to 11, in which the output unit displays a character predetermined by the user on the aerial display when authentication by the authentication method different from authentication by the biometric information is successful.

[Supplementary Note 13]

An entrance/exit management method including:
in an authentication terminal,
acquiring biometric information of a user;
requesting a server device for an authentication process using the biometric information of the user, and controlling opening/closing of a gate in accordance with an authentication result acquired from the server device; and
outputting displayed information based on the authentication result to an aerial display with which it is possible for a person at a prescribed position to visually recognize the displayed information based on the authentication result.

[Supplementary Note 14]

A computer-readable storage medium that stores a program for causing a computer mounted on an authentication terminal to execute processing of:
acquiring biometric information of a user;
requesting a server device for an authentication process using the biometric information of the user, and controlling opening/closing of a gate in accordance with an authentication result acquired from the server device; and
outputting displayed information based on the authentication result to an aerial display with which it is possible for a person at a prescribed position to visually recognize the displayed information based on the authentication result.

The disclosures of the documents of the cited related art are incorporated herein by reference. Although the example embodiments of the present invention have been described above, the present invention is not limited to these example embodiments. It will be understood by those skilled in the art that these example embodiments are exemplary only and that various variations are possible without departing from the scope and spirit of the present invention. In other words, it goes without saying that the present invention includes various modifications and corrections that can be made by those skilled in the art in accordance with the entire disclosure including the claims and the technical idea.

REFERENCE SIGNS LIST 10, 100 Authentication terminal
11, 11-1, 11-2 Conference room terminal
12 Aerial display
13 Hologram display surface
14 Visible region
20 Server device
30 Camera device
40, 40-1 to 40-3 Gate
101 Acquisition unit
102 Authentication request unit
103 Output unit
201, 301, 401 Communication control unit
202 User registration unit
203 Authentication unit
204 User management unit
205 Retrieval request processing unit
206, 306, 405 Storage unit
207 Conference room management unit
211 User information acquisition unit
212 ID generation unit
213 Feature amount generation unit
214 Entry management unit
302, 402 Face image acquisition unit
303, 403 Authentication request unit
304 Retrieval request unit
305 Retrieval result output unit
311 Processor
312 Memory
313 Input/output interface
314 Communication interface
404 Conference information display unit

What is claimed is:

1. An authentication terminal comprising:
at least one memory storing a computer program; and
at least one processor configured to execute the computer program to:

acquire biometric information of a user;
request a server device for an authentication process using the biometric information of the user;
acquire an authentication result from the server device;
display a first part of a gesture that includes a trace of a part of a character on an aerial display at which a person at a prescribed position is able to visually recognize the displayed first part of the gesture; and
perform control to open a gate when the authentication result acquired from the server device indicates success and the user has completed a second part of the gesture that includes a trace of a remaining part of the character by tracing a shape of the character, the second part of the gesture not being displayed on the aerial display.

2. The authentication terminal according to claim 1, wherein the gesture is predetermined by the user.

3. The authentication terminal according to claim 1, wherein the processor is configured to execute the computer program to display the character predetermined by the user on the aerial display when the authentication result acquired from the server device indicates success.

4. An entrance/exit management method performed by an authentication terminal and comprising:
   acquiring biometric information of a user;
   requesting a server device for an authentication process using the biometric information of the user;
   acquiring an authentication result from the server device;
   displaying a first part of a gesture that includes a trace of a part of a character on an aerial display at which a person at a prescribed position is able to visually recognize the displayed first part of the gesture; and
   performing control to open a gate when the authentication result acquired from the server device indicates success and the user has completed a second part of the gesture that includes a trace of a remaining part of the character by tracing a shape of the character, the second part of the gesture not displayed on the aerial display.

5. A non-transitory computer-readable storage medium that stores a program executable by a computer mounted on an authentication terminal to execute processing comprising:
   acquiring biometric information of a user;
   requesting a server device for an authentication process using the biometric information of the user;
   acquiring an authentication result from the server device;
   displaying a first part of a gesture that includes a trace of a part of a character on an aerial display at which a person at a prescribed position is able to visually recognize the displayed first part of the gesture; and
   performing control to open a gate when the authentication result acquired from the server device indicates success and the user has completed a second part of the gesture that includes a trace of a remaining part of the character by tracing a shape of the character, the second part of the gesture not displayed on the aerial display.

* * * * *